US012748513B2

(12) United States Patent
Ko et al.

(10) Patent No.: US 12,748,513 B2
(45) Date of Patent: Sep. 29, 2026

(54) DISPLAY DEVICE

(71) Applicant: Samsung Display Co., LTD., Yongin-si (KR)

(72) Inventors: Gyung-Min Ko, Yongin-si (KR); Gi-Na Yoo, Yongin-si (KR); Yong-Hwan Park, Yongin-si (KR); Seongjun Lee, Yongin-si (KR); Seungchan Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/885,176

(22) Filed: Sep. 13, 2024

(65) Prior Publication Data

US 2025/0094007 A1 Mar. 20, 2025

(30) Foreign Application Priority Data

Sep. 15, 2023 (KR) ........................ 10-2023-0122985

(51) Int. Cl.
*G06F 3/044* (2006.01)

(52) U.S. Cl.
CPC .. *G06F 3/0446* (2019.05); *G06F 2203/04107* (2013.01); *G06F 2203/04111* (2013.01); *G06F 2203/04112* (2013.01)

(58) Field of Classification Search
CPC ......... G06F 3/0446; G06F 2203/04107; G06F 2203/04111; G06F 2203/04112; G06F 3/0443; G06F 3/0412; G06F 3/044; H10K 59/40; H10K 59/353; H10K 59/88
See application file for complete search history.

(56) References Cited

U.S. PATENT DOCUMENTS 10,062,739 B2 8/2018 Jang et al.
10,126,864 B2 11/2018 Jeong et al.
10,700,304 B2 6/2020 Helander et al.
(Continued)

FOREIGN PATENT DOCUMENTS

KR 1020180052830 A 5/2018
KR 101929281 B1 3/2019
(Continued)

*Primary Examiner* — Md Saiful A Siddiqui
(74) *Attorney, Agent, or Firm* — CANTOR COLBURN LLP

(57) ABSTRACT

A display device includes a display panel including light-emitting regions, an input sensor, and conductive patterns. The conductive patterns include a first sensing electrode including first sensing patterns provided along a first direction, and bridge patterns connecting two adjacently disposed first sensing patterns, a second sensing electrode, spaced apart from the first sensing electrode, includes second sensing patterns provided along a second direction crossing the first direction, and dummy patterns overlapping one of the first sensing electrode or the second sensing electrode on a plane. Each of the first sensing patterns and the second sensing patterns includes mesh lines in which openings overlapping the light-emitting regions are defined. Each of the bridge patterns includes a first bridge pattern connected to a corresponding first sensing pattern, and a second bridge pattern disposed on a layer different from the first bridge pattern, and connected to the first bridge pattern.

20 Claims, 15 Drawing Sheets

(56) References Cited

U.S. PATENT DOCUMENTS

| | | | | |
|---|---|---|---|---|
| 11,003,292 | B2 | 5/2021 | Kim et al. | |
| 11,609,673 | B1 | 3/2023 | Yoon et al. | |
| 11,726,627 | B2 | 8/2023 | Lee et al. | |
| 2019/0004638 | A1 * | 1/2019 | Lee | G06F 3/044 |
| 2019/0189699 | A1 * | 6/2019 | Ye | G06F 3/0445 |
| 2019/0220123 | A1 * | 7/2019 | Kanaya | G06F 3/0412 |
| 2020/0401276 | A1 * | 12/2020 | Yang | G06F 3/0448 |
| 2021/0019007 | A1 * | 1/2021 | Park | G06F 3/0412 |
| 2022/0028935 | A1 * | 1/2022 | Park | H10K 59/352 |
| 2022/0334678 | A1 * | 10/2022 | Long | G06F 3/0443 |
| 2023/0049340 | A1 * | 2/2023 | Wang | G06F 3/0446 |
| 2023/0269969 | A1 | 8/2023 | Lee et al. | |

FOREIGN PATENT DOCUMENTS

| | | | |
|---|---|---|---|
| KR | 102381659 | B1 | 4/2022 |
| KR | 1020220120035 | A | 8/2022 |
| WO | 2022097043 | A1 | 5/2022 |

* cited by examiner

DISPLAY DEVICE

This application claims priority to Korean Patent Application No. 10-2023-0122985, filed on Sep. 15, 2023, and all the benefits accruing therefrom under 35 U.S.C. § 119, the content of which in its entirety is herein incorporated by reference.

BACKGROUND

1. Field

The present invention relates to a display device, and more particularly, to a display device with improved viewability.

2. Description of Related Art

Multimedia devices such as televisions, mobile phones, tablet computers, navigation systems, or game consoles include a display device that displays an image to a user through a display screen. The display device may include a display panel that generates the image and an input sensor that detects a user's touch.

The input sensor may include a conductor that detects an external input, and the conductor of the input sensor disposed on the display panel may affect light-emitting efficiency of the display device, or external light reflectance of the display device.

SUMMARY

The present invention provides a display device with improved viewability.

An embodiment of the invention provides a display device including a display panel including a plurality of light-emitting regions, and an input sensor disposed on the display panel, and including a plurality of conductive patterns, wherein the plurality of conductive patterns include a first sensing electrode including a plurality of first sensing patterns provided along a first direction, and a plurality of bridge patterns connecting two adjacently disposed first sensing patterns of the plurality of first sensing patterns, a second sensing electrode spaced apart from the first sensing electrode, and including a plurality of second sensing patterns provided along a second direction crossing the first direction, and a plurality of dummy patterns overlapping at least one of the first sensing electrode or the second sensing electrode on a plane, where each of the plurality of first sensing patterns and the plurality of second sensing patterns includes a plurality of mesh lines in which a plurality of openings overlapping the plurality of light-emitting regions are defined, and where each of the plurality of bridge patterns includes a first bridge pattern connected to a corresponding first sensing pattern of the plurality of first sensing patterns through a first contact hole, and a second bridge pattern disposed on a layer different from the first bridge pattern, and connected to the first bridge pattern through a second contact hole.

In an embodiment, the plurality of first sensing patterns may include a (1-1)-th sensing pattern, and a (1-2)-th sensing pattern disposed adjacent to the (1-1)-th sensing pattern along the first direction, the first bridge pattern may include a (1-1)-th bridge pattern connected to the (1-1)-th sensing pattern, and a (1-2)-th bridge pattern connected to the (1-2)-th sensing pattern, where the (1-1)-th bridge pattern and the (1-2)-th bridge pattern may be spaced apart from each other.

In an embodiment, the second bridge pattern may include a (2-1)-th bridge pattern connected to the (1-1)-th bridge pattern, and a (2-2)-th bridge pattern connected to the (1-2)-th bridge pattern.

In an embodiment, the (2-1)-th bridge pattern and the (2-2)-th bridge pattern may be connected to each other to have an integrated shape.

In an embodiment, each of the plurality of bridge patterns may further include a third bridge pattern disposed on a layer different from the second bridge pattern, and connected to at least one of the (2-1)-th bridge pattern and the (2-2)-th bridge pattern.

In an embodiment, the third bridge pattern may partially overlap the second sensing electrode on a plane.

In an embodiment, the third bridge pattern may be connected to each of the (2-1)-th bridge pattern and the (2-2)-th bridge pattern.

In an embodiment, the third bridge pattern may be disposed on the same layer as the first bridge pattern.

In an embodiment, a length of the first bridge pattern in the first direction may be substantially the same as a length of the third bridge pattern in the first direction.

In an embodiment, the second bridge pattern may be disposed on the same layer as the first sensing pattern and the second sensing pattern.

In an embodiment, the second sensing electrode may further include a connection pattern disposed between two adjacent second sensing patterns of the plurality of second sensing patterns, and having an integrated shape with the plurality of second sensing patterns, the second bridge pattern may be disposed adjacent to the connection pattern, and a cutting portion may be defined between the second bridge pattern and the connection pattern.

In an embodiment, the input sensor may further include an insulating sensing layer disposed between the first bridge pattern and the plurality of first sensing patterns, where the first contact hole and the second contact hole may be defined in the insulating sensing layer.

In an embodiment, a boundary portion may be defined between the first sensing pattern and the second sensing electrode, where the first bridge pattern may partially overlap the boundary portion.

In an embodiment, a length of the first bridge pattern in the first direction may be substantially the same as a length of each of the plurality of dummy patterns in the first direction.

In an embodiment, the first bridge pattern may extend in the first direction, and the second bridge pattern may extend in the second direction.

In an embodiment, the plurality of first sensing patterns may include a (1-1)-th sensing pattern, and a (1-2)-th sensing pattern disposed adjacent to the (1-1)-th sensing pattern along the first direction, where the plurality of bridge patterns may include a first sub-bridge pattern connecting the (1-1)-th sensing pattern and the (1-2)-th sensing pattern, and a second sub-bridge pattern connecting the (1-1)-th sensing pattern and the (1-2)-th sensing pattern.

In an embodiment, the plurality of light-emitting regions may include a first light-emitting region emitting a first color light, a second light-emitting region emitting a second color light different from the first color light, and a third light-emitting region emitting a third color light different from the first color light and the second color light, where the first light-emitting region and the second light-emitting region may be alternately arranged along the second direction, and the third light-emitting region may be arranged to be spaced apart from the first light-emitting region and the second light-emitting region along the first direction.

In an embodiment, a display device includes a display panel including a plurality of light-emitting regions, and an input sensor disposed on the display panel, and including a plurality of conductive patterns, wherein the plurality of conductive patterns include a first sensing electrode including a plurality of first sensing patterns provided along a first direction, and a plurality of bridge patterns connecting two adjacently disposed first sensing patterns of the plurality of first sensing patterns, and a second sensing electrode spaced apart from the first sensing electrode, and including a plurality of second sensing patterns provided along a second direction crossing the first direction, where each of the plurality of first sensing patterns and the plurality of second sensing patterns includes a plurality of mesh lines in which a plurality of openings overlapping the plurality of light-emitting regions are defined, where each of the plurality of bridge patterns includes a first bridge pattern connected to a corresponding first sensing pattern of the plurality of first sensing patterns through a first contact hole, and extending along the first direction, and a second bridge pattern connected to the first bridge pattern through a second contact hole, and extending along the second direction.

In an embodiment, the second bridge pattern may be disposed on the same layer as the first sensing pattern and the second sensing pattern, and the first bridge pattern may be disposed on a layer different from the second bridge pattern.

In an embodiment, a display device includes a display panel including a plurality of light-emitting regions, and an input sensor disposed on the display panel, and including a plurality of conductive patterns, wherein the plurality of conductive patterns include a first sensing electrode including a plurality of first sensing patterns provided along a first direction, and a plurality of bridge patterns connecting two adjacently disposed first sensing patterns of the plurality of first sensing patterns, and a second sensing electrode spaced apart from the first sensing electrode, and including a plurality of second sensing patterns provided along a second direction crossing the first direction, where each of the plurality of first sensing patterns and the plurality of second sensing patterns includes a plurality of mesh lines in which a plurality of openings overlapping the plurality of light-emitting regions are defined, where each of the plurality of bridge patterns includes a first bridge pattern connected to one corresponding first sensing pattern of the plurality of first sensing patterns through a first contact hole, and a second bridge pattern at least partially disposed on the same layer as the second sensing electrode, and connected to the first bridge pattern through a second contact hole, and wherein a cutting portion is defined between the second bridge pattern and the second sensing electrode.

BRIEF DESCRIPTION OF THE FIGURES

The accompanying drawings are included to provide a further understanding of the invention, and are incorporated in and constitute a part of this specification. The drawings illustrate embodiments of the invention and, together with the description, serve to explain principles of the invention. In the drawings.

DETAILED DESCRIPTION

Figure 1:
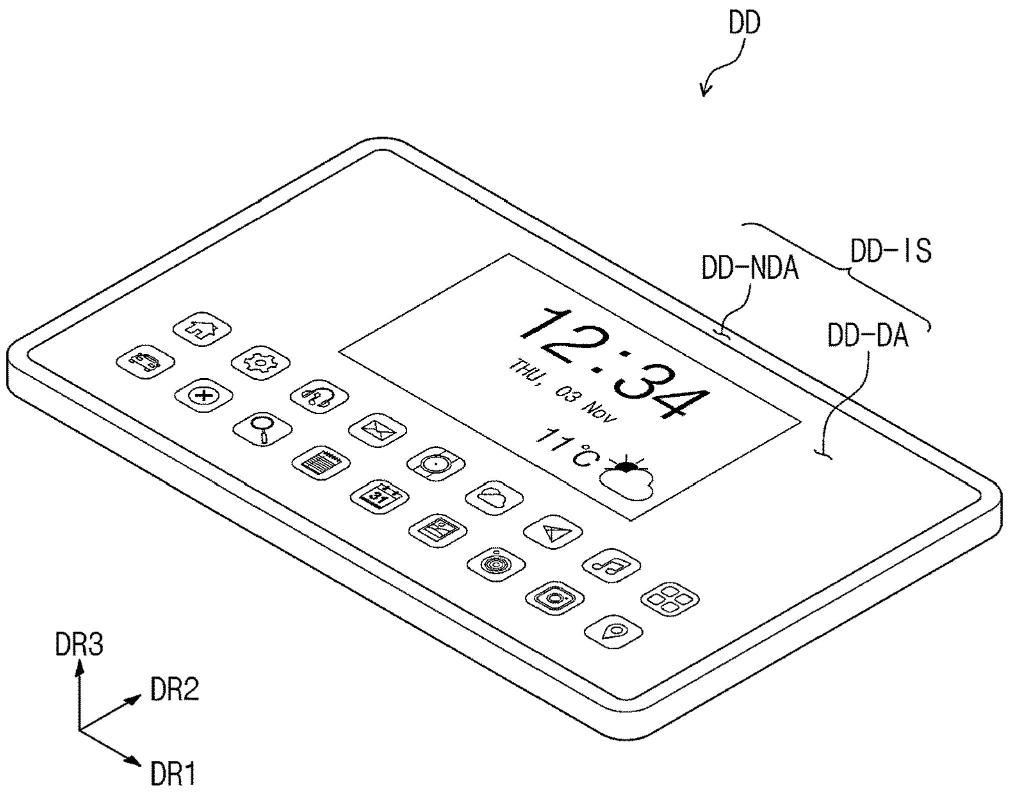
FIG. 1 is a perspective view of a display device, according to an embodiment.

In this specification, when a component (or region, layer, portion, etc.) is referred to as "on", "connected", or "coupled" to another component, it means that it is placed/connected/coupled directly on the other component or a third component can be disposed between them.

In the specification, "directly disposed" may mean that there is no layer, film, region, plate, etc. added between a portion such as a layer, film, region, or plate and another portion. For example, "direct disposed" may mean placing two layers or two members without using an additional member such as an adhesive member therebetween.

In the specification, the same reference numerals or symbols refer to the same elements. In addition, in the drawings, thicknesses, ratios, and dimensions of components are exaggerated for effective description of technical content. "And/or" includes all combinations of one or more that the associated elements may define.

In the specification, terms such as first and second may be used to describe various components, but the components should not be limited by the terms. These terms are only used for the purpose of distinguishing one component from other components. For example, without departing from the scope of the invention, a first component may be referred to as a second component, and similarly, a second component may be referred to as a first component. Singular expressions include plural expressions unless the context clearly indicates otherwise.

In addition, in the specification, terms such as "below", "lower", "above", and "upper" are used to describe the relationship between components shown in the drawings. The terms are relative concepts and are described based on the directions indicated in the drawings.

In the specification, terms such as "include" or "have" are intended to designate the presence of a feature, number, step, action, component, part, or combination thereof described in the specification, and it should be understood that it does not preclude the possibility of presence or addition of one or more other features, numbers, steps, operations, components, parts, or combinations thereof.

Unless otherwise defined, all terms (including technical and scientific terms) used in this specification have the same meaning as commonly understood by one of ordinary skill in the art to which this invention belongs. In addition, terms such as terms defined in commonly used dictionaries should be interpreted as having a meaning consistent with the meaning having in the context of the related technology, and should not be interpreted as too ideal or too formal unless explicitly defined here.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

Hereinafter, embodiments of the invention will be described with reference to the drawings.

FIG. 1 is a perspective view of a display device DD, according to an embodiment. As illustrated in FIG. 1, the display device DD may display an image through a display surface DD-IS. The display surface DD-IS may have a rectangular shape, on a plane, having long sides extending in a first direction DR1 and short sides extending in a second direction DR2 crossing the first direction DR1. However, the invention is not limited thereto, and the display surface DD-IS may have various shapes such as a circle or a polygon.

In an embodiment, a third direction DR3 may be defined as a direction substantially perpendicular to a plane defined by the first direction DR1 and the second direction DR2. The front surface (or upper surface) and the rear surface (or lower surface) of each member constituting the display device DD may be opposed to each other in the third direction DR3, and the normal direction of each of the front surface and the rear surface may be directed to be substantially parallel to the third direction DR3. A distance, between the front surface and the rear surface of a member, defined along the third direction DR3 may correspond to a thickness of the member.

In the present specification, "on a plane" may be defined as a state of being viewed in the third direction DR3. That is, "on a plane" may be described on the basis of a plane defined by the first direction DR1 and the second direction DR2. In the present specification, "on a cross-section" may be defined as a state of being viewed in the first direction DR1 or the second direction DR2. Meanwhile, directions indicated by the first to third directions DR1, DR2, and DR3, respectively, are relative concepts, and may be changed to other directions.

In an embodiment, the display device DD provided with a planar display surface is illustrated, but the invention is not limited thereto. The display device DD may include a curved display surface or a cubic display surface. The cubic display surface may include a plurality of display regions indicating different directions, for example, a bent display surface. The display device DD according to an embodiment may be a flexible display device DD. The flexible display device DD may be a foldable display device.

In an embodiment, the display device DD capable of being applied to a tablet terminal is exemplarily illustrated. Electronic modules, a camera module, a power module, etc., mounted on a main board may be disposed with the display device DD in a bracket/case to constitute the tablet terminal. The display device DD according to an embodiment may be applied to not only a large-sized electronic device such as a television, or a monitor, but also a small- and medium-sized electronic device such as a handphone, a car navigation system, a game console, or a smart watch.

In an embodiment and as illustrated in FIG. 1, the display surface DD-IS includes an image region DD-DA on which an image is displayed, and a bezel region DD-NDA which is adjacent to the image region DD-DA. The bezel region DD-NDA is a region on which the image is not displayed. FIG. 1 illustrates icon images as an example of the image.

In an embodiment and as illustrated in FIG. 1, the image region DD-DA may have a substantially tetragonal shape. "A substantially tetragonal shape" includes not only a tetragonal shape in a mathematical sense, but also a tetragonal shape in which not vertexes but curved boundaries thereof are defined in corner regions thereof.

In an embodiment, the bezel region DD-NDA may surround the image region DD-DA, but the invention is not limited thereto, and a shape of the bezel region DD-NDA may be changed. For example, the bezel region DD-NDA may be disposed only one side of the image region DD-DA.

Figure 2:
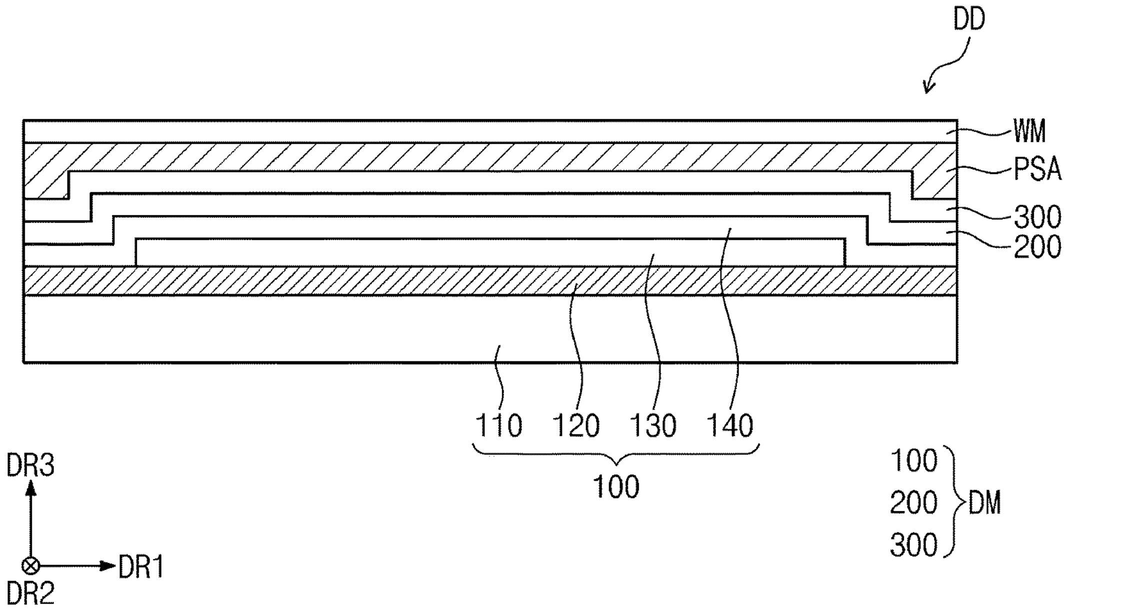
FIG. 2 is a cross-sectional view of a display device, according to an embodiment.

FIG. 2 is a cross-sectional view of a display device DD, according to an embodiment.

In an embodiment, the display device DD may include a display module DM and a window WM disposed on the display module DM. The display module DM and the window WM may be coupled to each other by an adhesive layer PSA. According to an embodiment, the window WM may be formed in a coating manner, and the window WM may be in contact with the display module DM. In this case, the adhesive layer PSA may be omitted.

In an embodiment, the display module DM may include a display panel 100, an input sensor 200, and an anti-reflective layer 300. The display panel 100 may include a base layer 110, a driving element layer 120, a light-emitting element layer 130, and an encapsulation layer 140.

In an embodiment, the driving element layer 120 is disposed on an upper surface of the base layer 110. The base layer 110 may be a flexible substrate bendable, foldable, or rollable. The base layer 110 may be a glass substrate, a metal substrate, or a polymer substrate. However, the invention is not limited thereto, and the base layer 110 may be an inorganic layer, an organic layer, or a composite material layer. The base layer 110 substantially has the same shape as the display panel 100.

In an embodiment, the base layer 110 may have a multi-layered structure. For example, the base layer 110 may include a first synthetic resin layer, a second synthetic resin layer, and inorganic layers disposed therebetween. Each of the first and second synthetic resin layers may include a polyimide-based resin, but is not specially limited thereto.

In an embodiment, the driving element layer 120 may be disposed on the base layer 110. The driving element layer 120 may include a plurality of insulating layers, a plurality of semiconductor patterns, a plurality of conductive patterns, signal line, etc. The driving element layer 120 may include a driver of a pixel.

In an embodiment, the light-emitting element layer 130 may be disposed on the driving element layer 120. The light-emitting element layer 130 may include a light-emitting element. For example, the light-emitting element may include an organic light-emitting material, an inorganic light-emitting material, an organic-inorganic light-emitting material, a quantum dot, a quantum rod, a micro-LED, or a nano-LED.

In an embodiment, the encapsulation layer 140 may be disposed on the light-emitting element layer 130. The encapsulation layer 140 may protect the light-emitting element layer 130, that is, a light-emitting element from foreign matters such as moisture, oxygen, and dust particles. The encapsulation layer 140 may include at least one inorganic encapsulation layer. The encapsulation layer 140 may include a stack structure of a first inorganic encapsulation layer/an organic encapsulation layer/a second inorganic encapsulation layer.

In an embodiment, the input sensor 200 may be directly disposed on the display panel 100. The input sensor 200 may detect a user's input, for example, in an electromagnetic induction manner and/or a capacitive manner. The display panel 100 and the input sensor 200 may be formed through a continuous process. Here, "directly disposed" may mean that a third component is not disposed between the display panel 100 and the input sensor 200. For example, a separate adhesive layer may not be disposed between the display panel 100 and the input sensor 200.

In an embodiment, the anti-reflective layer 300 reduces reflectance of external light incident from the top of the window WM. In an embodiment, the anti-reflective layer 300 may include a retarder and a polarizer. The retarder may be a film type or a liquid crystal coating type, and may include a $\lambda/2$ retarder and/or a $\lambda/4$ retarder. The polarizer may be also a film type or a liquid crystal coating type. The film type may include an elongated synthetic resin film, and the liquid crystal coating type may include liquid crystals arranged in a predetermined arrangement. The retarder and the polarizer may further include a protective film. The retarder and the polarizer themselves, or the protective film may be defined as a base layer of the anti-reflective layer 300.

In an embodiment, the anti-reflective layer 300 may include color filters. The color filters have a predetermined arrangement. The arrangement of the color filters may be determined in consideration of light-emitting colors of pixels included in the display panel 100. The anti-reflective layer 300 may further include a black matrix adjacent to the color filters. The anti-reflective layer 300 including the color filters may be directly disposed on the display panel 100.

In an embodiment, the window WM may include a base layer and a light-blocking pattern. The base layer may include a glass substrate, a synthetic resin film, and/or the like. The light-blocking pattern may partially overlap a base layer. The light-blocking pattern may be disposed on a rear surface of the base layer, and may substantially define the bezel region DD-NDA (see FIG. 1) of the display device DD. A region in which the light-blocking pattern is not disposed may define the image region DD-DA (see FIG. 1) of the display device DD.

Figure 3:
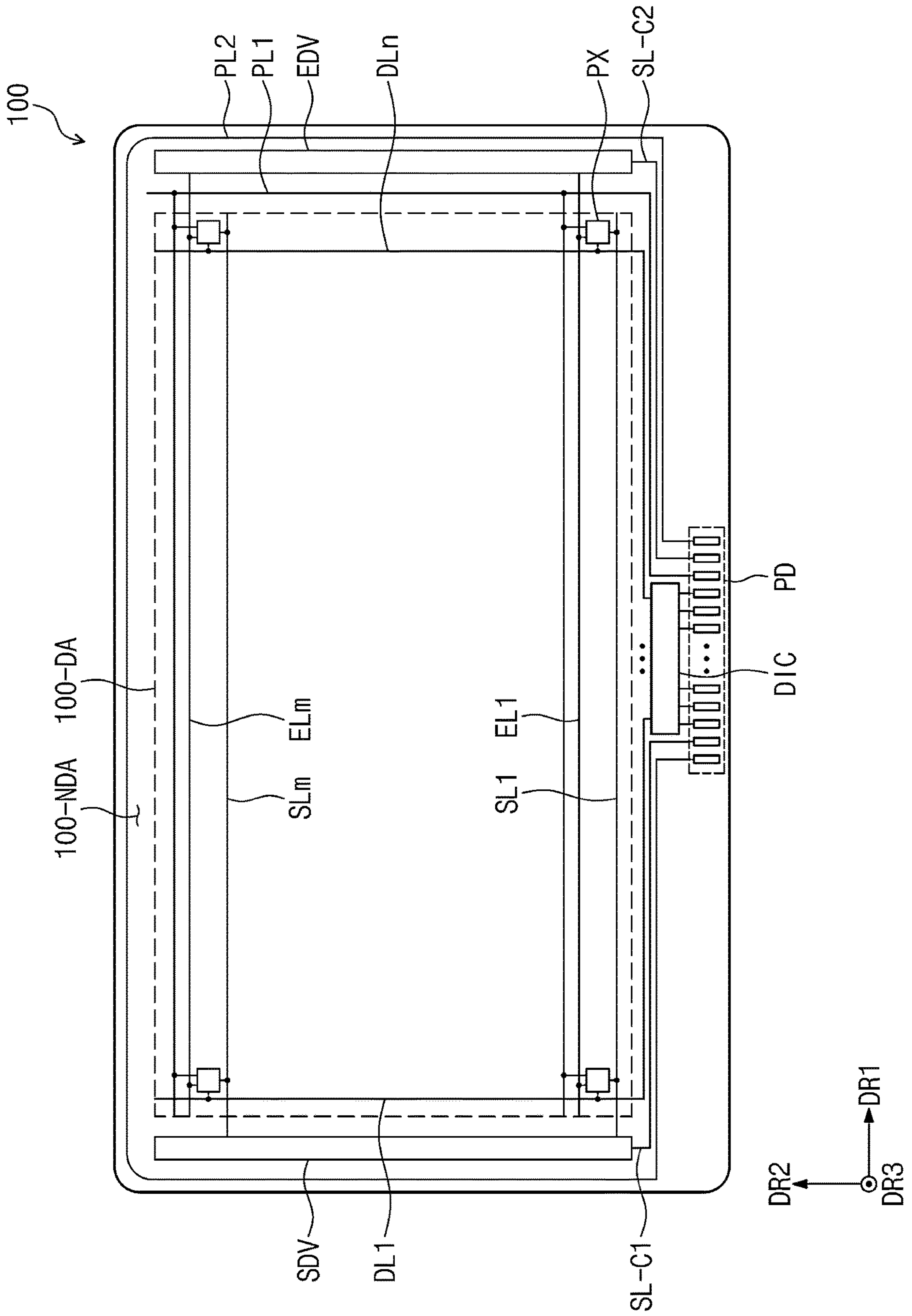
FIG. 3 is a plan view of a display panel, according to an embodiment.

FIG. 3 is a plan view of a display panel 100, according to an embodiment.

In an embodiment and referring to FIG. 3, the display panel 100 may include a plurality of pixels PX, a scan driver SDV, a light emission driver EDV, a plurality of signal lines, and a plurality of pads PD. The plurality of pixels PX are disposed in a display region 100-DA. A driving chip DIC mounted in a non-display region 100-NDA may include a data driver. The display region 100-DA may correspond to the image region DD-DA in FIG. 1, and the non-display region 100-NDA may correspond to the bezel region DD-NDA in FIG. 1. In the present specification, the wording, "A region or a portion corresponds to another region or another portion" means "the region or the portion overlaps the other region or the other portion", and is not necessarily limited to "the two different regions or portions have the same area". In an embodiment, the data driver may be also integrated in the display panel 100 like the scan driver SDV and the light emission driver EDV.

In an embodiment, the plurality of signal lines may include a plurality of scanning lines SL1 to SLm, a plurality of data lines DL1 to DLn, a plurality of light-emitting lines EL1 to ELm, first and second control lines SL-C1 and SL-C2, and first and second power lines PL1 and PL2. m and n are natural numbers of two or more.

In an embodiment, the scanning lines SL1 to SLm may extend in the first direction DR1 to be electrically connected to the pixels PX and the scan driver SDV. The data lines DL1 to DLn may extend in the second direction DR2 to be electrically connected to the pixels PX and the driving chip DIC. The light-emitting lines EL1 to ELm may extend in the first direction DR1 to be electrically connected to the pixels PX and the light emission driver EDV.

In an embodiment, the first power line PL1 receives a first power voltage, and the second power line PL2 receives a second power voltage having a lower level than the first power voltage. Although not shown, a second electrode (for example, a cathode) of a light-emitting element is connected to the second power line PL2.

In an embodiment, the first control line SL-C1 may be connected to the scan driver SDV, and may extend toward a lower end of the display panel 100. The second control line SL-C2 may be connected to the light emission driver EDV, and may extend toward the lower end of the display panel 100. The pads PD may be disposed in the non-display region 100-NDA adjacent to the lower end of the display panel 100, and may be more adjacent to the lower end of the display panel 100 than the driving chip DIC. The pads PD may be connected to the driving chip DIC and some signal lines.

In an embodiment, the scan driver SDV may generate a plurality of scanning signals, and the scanning signals may be applied to the pixels PX through the scanning lines SL1 to SLm. The driving chip DIC may generate a plurality of data voltages, and the data voltages may be applied to the pixels PX through the data lines DL1 to DLn. The light emission driver EDV may generate a plurality of light-emitting signals, and the light-emitting signals may be applied to the pixels PX through the light-emitting lines EL1 to ELm. The pixels PX may be supplied with the data voltages in response to the scanning signals. The pixels PX may display an image by emitting light having luminance corresponding to the data voltages in response to the light-emitting signals.

Figure 4A:
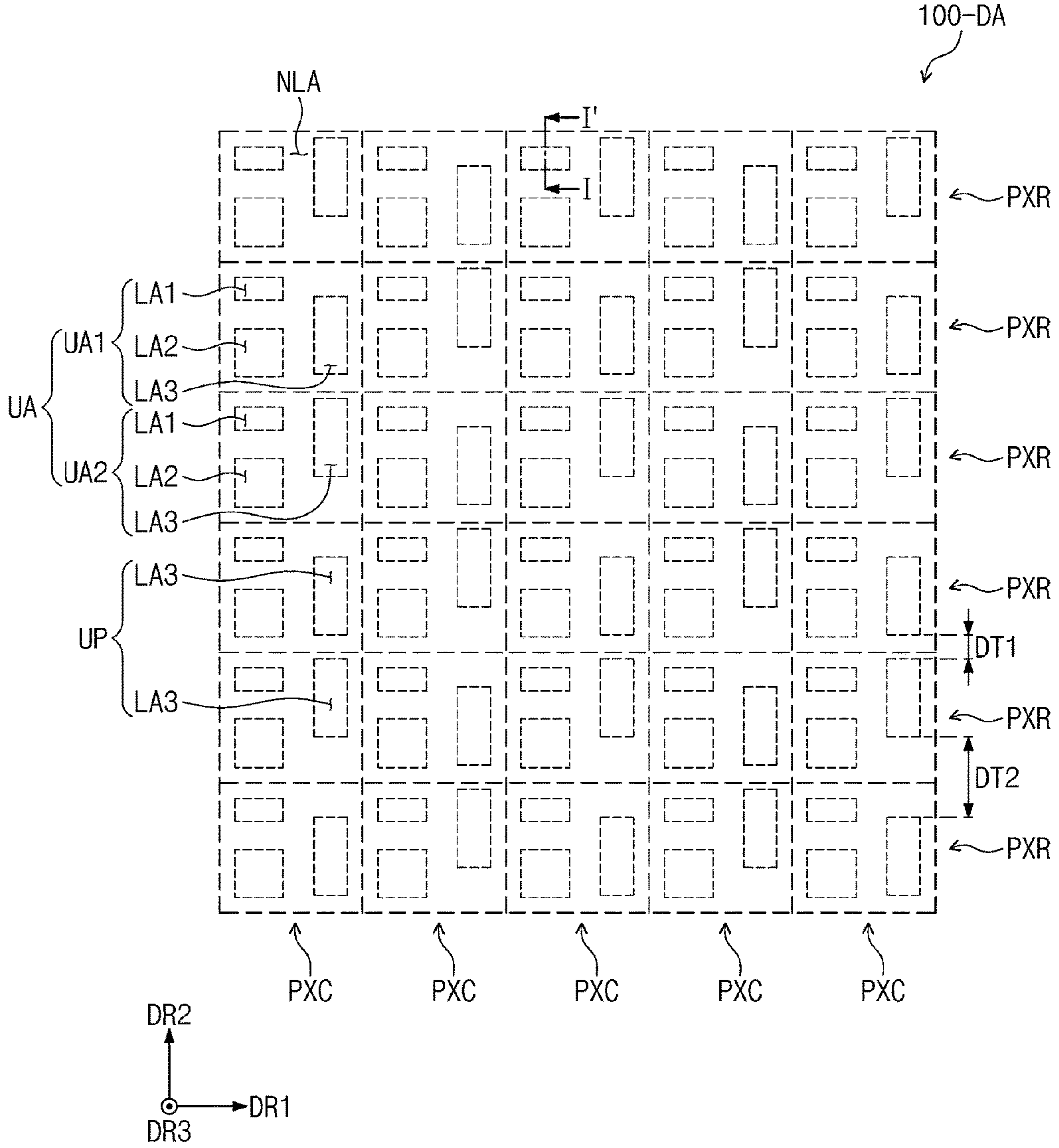
FIG. 4A is an enlarged plan view of a display region, according to an embodiment.
Figure 4B:
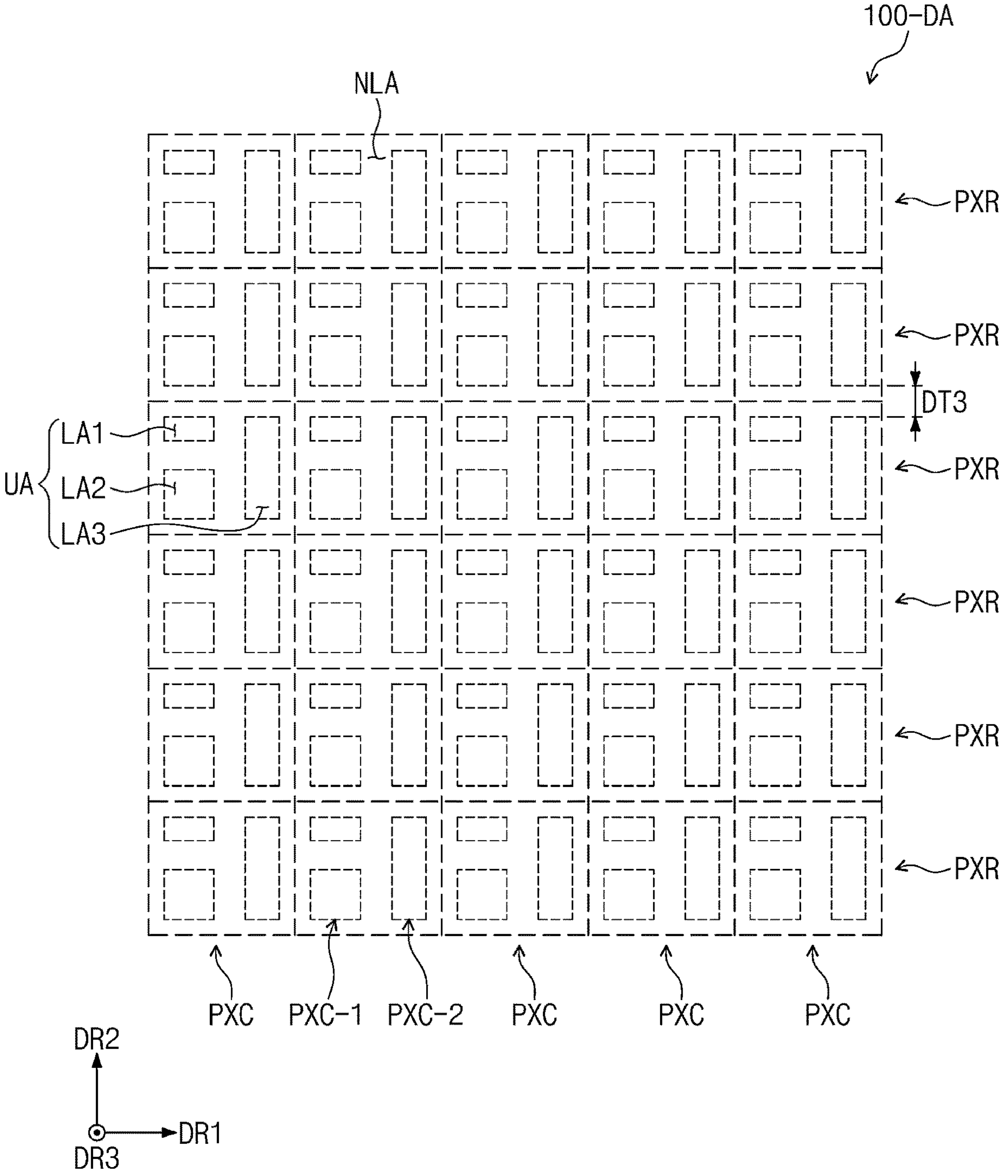
FIG. 4B is an enlarged plan view of a display region, according to an embodiment.
Figure 4C:
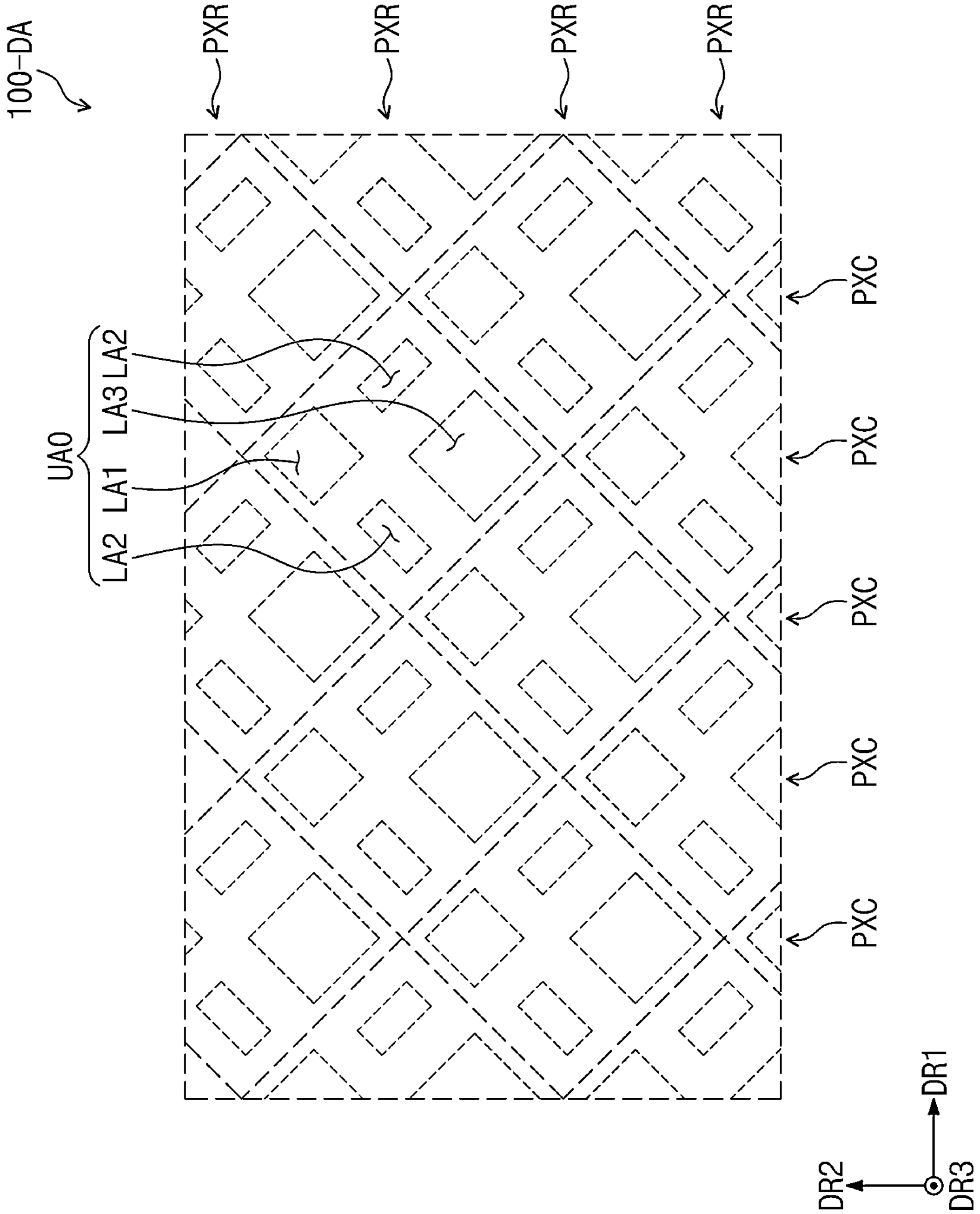
FIG. 4C is an enlarged plan view of a display region, according to an embodiment.

FIGS. 4A to 4C are enlarged plan views of a display region 100-DA, according to an embodiment.

In an embodiment and referring to FIG. 4A, the display region 100-DA may include a plurality of light-emitting regions LA1, LA2, and LA3, and a non-light-emitting region NLA disposed adjacent to the plurality of light-emitting regions LA1, LA2, and LA3. The non-light-emitting region NLA sets boundaries of the light-emitting regions LA1, LA2, and LA3.

In an embodiment, the light-emitting regions LA1, LA2, and LA3 may be disposed so as to correspond one-to-one to the pixels PX in FIG. 3. The pixels PX respectively include light-emitting elements, and the light-emitting regions LA1, LA2, and LA3 may be regions emitting light formed in the light-emitting element. A disposition relationship of the light-emitting regions LA1, LA2, and LA3 and the non-light-emitting region NLA will be described with reference to FIG. 5.

In an embodiment, the light-emitting regions LA1, LA2, and LA3 may include a first light-emitting region LA1 (or first color light-emitting region) forming a first color light, a second light-emitting region LA2 (or second color light-emitting region) forming a second color light, and a third light-emitting region LA3 (or third color light-emitting region) forming a third color light. In an embodiment, the first color light may be red light, the second color light may be green light, and the third color light may be blue light.

In an embodiment, the first light-emitting region LA1, the second light-emitting region LA2, and the third light-emitting region LA3 may have different areas, but the invention is not limited thereto. In an embodiment, the first light-emitting region LA1 may have the smallest area, and the third light-emitting region LA3 may have the greatest area.

In an embodiment, the first light-emitting region LA1, the second light-emitting region LA2, and the third light-emitting region LA3 may define one unit light-emitting region UA. The unit light-emitting region UA is a repetitive disposition unit of a light-emitting region disposed in the display region 100-DA. In an embodiment, the unit light-emitting region UA may include a first unit light-emitting region UA1 and a second unit light-emitting region UA2.

In an embodiment and referring to the first unit light-emitting region UA1 and the second unit light-emitting region UA2, the first light-emitting region LA1 and the second light-emitting region LA2 are disposed in one side (a left side in FIG. 4A) of the third light-emitting region LA3 in the first direction DR1. The second light-emitting region LA2 of each of the first unit light-emitting region UA1 and the second unit light-emitting region UA2 is disposed in one side (a lower side In FIG. 4A) of the first light-emitting region LA1 in the first direction DR1.

In an embodiment, positions of the third light-emitting region LA3 with respect to the first light-emitting region LA1 and the second light-emitting region LA2 in the first unit light-emitting region UA1 and the second unit light-emitting region UA2 are different in the second direction DR2. Referring to the first unit light-emitting region UA1, the third light-emitting region LA3 with respect to the first light-emitting region LA1 and the second light-emitting region LA2 is relatively disposed in a lower end of the first unit light-emitting region UA1 in the second direction DR2. Referring to the second unit light-emitting region UA2, the third light-emitting region LA3 with respect to the first light-emitting region LA1 and the second light-emitting region LA2 is relatively disposed in an upper end of the second unit light-emitting region UA2 in the second direction DR2. Shift in degrees of the third light-emitting region LA3 with respect to the first light-emitting region LA1 and the second light-emitting region LA2 in the second direction DR2 may be respectively different in the first unit light-emitting region UA1 and the second unit light-emitting region UA2. In an embodiment, the third light-emitting region LA3 may be relatively more shifted in the second unit light-emitting region UA2 than in the first unit light-emitting region UA1. However, the invention is not limited thereto, and the shift in degrees of the third light-emitting region LA3 with respect to the first light-emitting region LA1 and the second light-emitting region LA2 may be the same in the first unit light-emitting region UA1 and the second unit light-emitting region UA2 in the second direction DR2.

In an embodiment, the first unit light-emitting region UA1 and the second unit light-emitting region UA2 may be alternately disposed in a pixel row PXR in the first direction DR1. The first unit light-emitting region UA1 and the second unit light-emitting region UA2 are alternately disposed in a pixel column PXC along the second direction DR2. The third light-emitting region LA3 of the first unit light-emitting region UA1 and the third light-emitting region LA3 of the second unit light-emitting region UA2 are arranged in a predetermined rule by such a disposition of the first unit light-emitting region UA1 and the second unit light-emitting region UA2. Two adjacent third light-emitting regions LA3 of the first unit light-emitting region UA1 and the second unit light-emitting region UA2 are disposed to be spaced apart from each other by first spacing DT1, and relatively near to each other. The third light-emitting region LA3 of the first unit light-emitting region UA1 and the third light-emitting region LA3 of the second unit light-emitting region UA2 are spaced apart from each other by the first spacing DT1 to define a pair of light-emitting regions UP. The pair of light-emitting regions UP are spaced apart from each other in the pixel column PXC by second spacing DT2. The second spacing DT2 is greater than the first spacing DT1.

In an embodiment, the pair of light-emitting regions UP is formed due to a mask used in deposition. A light-emitting element disposed in the third light-emitting region LA3 of the first unit light-emitting region UA1 and a light-emitting element disposed in the third light-emitting region LA3 of the second unit light-emitting region UA2 include a light-emitting layer having an integrated shape. That is, a light-emitting layer disposed in the third light-emitting region LA3 of the first unit light-emitting region UA1 and a light-emitting layer disposed in the third light-emitting region LA3 of the second unit light-emitting region UA2 have the integrated shape, and are deposited using one mask. Openings corresponding to the pair of light-emitting regions UP are defined in the corresponding mask. A region between the openings of the mask corresponds to a blocking region of the mask. Since the openings corresponding to the pair of light-emitting regions UP are defined, a number of the openings may be reduced, and a width of the blocking region of the mask disposed between the openings in the second direction DR2 may be secured. Since the mask of a thin-film secures the width of the blocking region of the mask in the second direction DR2, a failure in which the mask is stretched in a deposition process may be suppressed.

In an embodiment, when the second spacing DT2 in FIG. 4A and third spacing DT3 between the third light-emitting regions LA3 illustrated in FIG. 4B are compared, this may be seen. Referring to FIG. 4B, one typed unit light-emitting region UA is disposed in the display region 100-DA. The third spacing DT3 between the third light-emitting regions LA3 of adjacent unit light-emitting regions UA in the pixel column PXC is smaller than the second spacing DT2 in FIG. 4A. In the mask used to form the third light-emitting regions LA3 in FIG. 4B, the number of the openings is greater, and the width of the blocking region is smaller. This is because the openings respectively corresponding to the third light-emitting regions LA3 are defined in the mask forming the light-emitting layers in the third light-emitting region LA3 illustrated in FIG. 4B.

In an embodiment, in each of FIGS. 4A and 4B, a pixel column in which the first light-emitting region LA1 and the second light-emitting region LA2 are alternately disposed along the second direction DR2 may be referred to as a first unit pixel column PXC-1, and a pixel column in which the third light-emitting region LA3 is disposed along the second direction DR2 may be referred to as a second pixel column PXC-2.

In an embodiment and referring to FIG. 4C, one typed unit light-emitting region UA0 is disposed in the display region 100-DA. The unit light-emitting region UA0 includes the second light-emitting regions LA2 disposed to be spaced apart from each other in the first direction DR1, and the first light-emitting region LA1 and the third light-emitting region LA3 disposed to be spaced apart from each other in the second direction DR2. Four light-emitting regions LA1, LA2, and LA3 of the unit light-emitting region UA0 are arranged in a rhombus form. The unit light-emitting regions UA0 of the pixel rows PXR are arranged along the first direction DR1. The unit light-emitting regions UA0 of adjacent pixel rows PXR may be disposed to be staggered with each other along the first direction DR1. The unit light-emitting regions UA0 of adjacent pixel columns PXC may be disposed to be staggered with each other along the second direction DR2.

Figure 5:
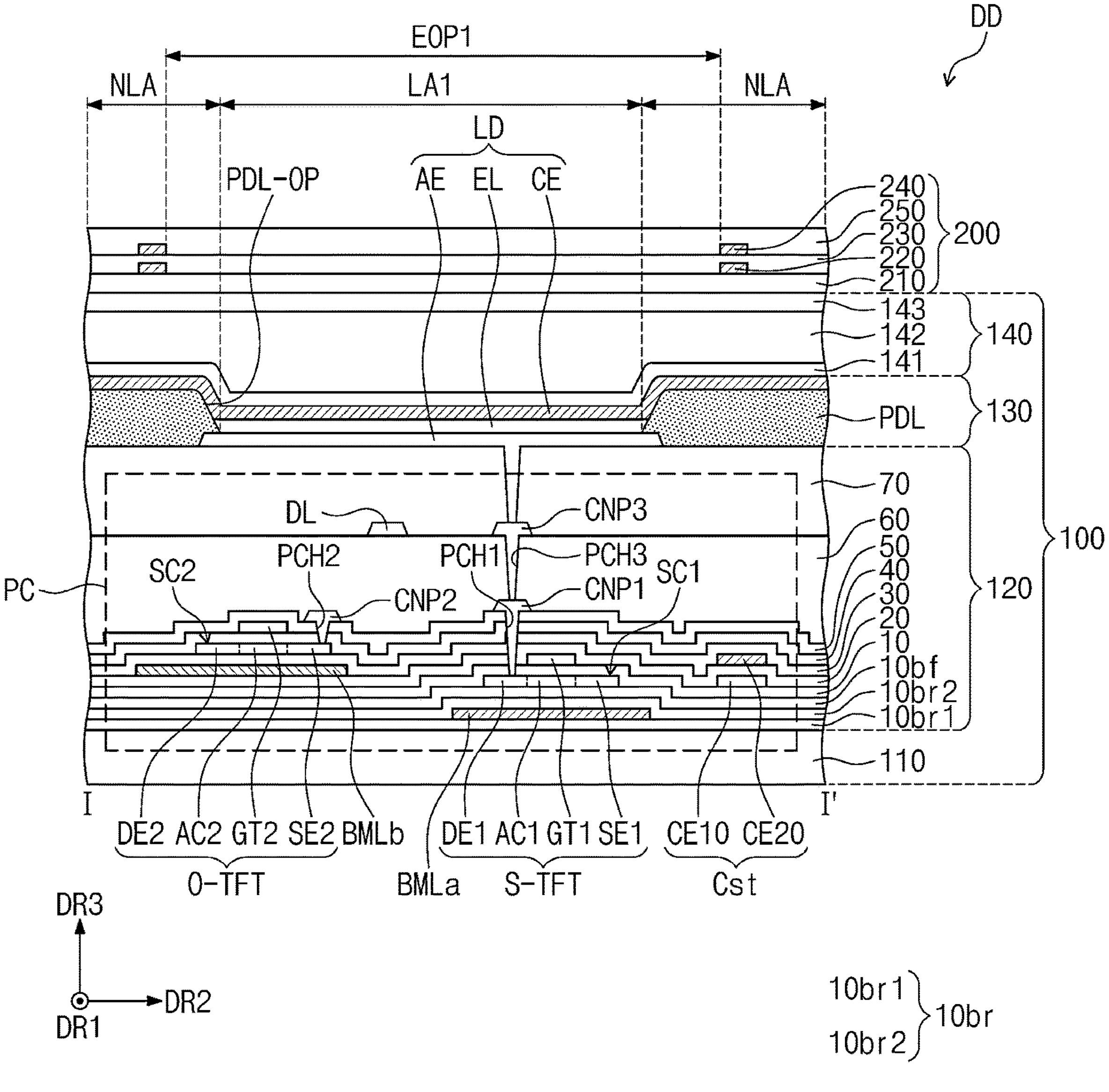
FIG. 5 is a cross-sectional view of a display device, according to an embodiment.

FIG. 5 is a cross-sectional view of a display device DD, according to an embodiment. FIG. 5 is a cross-sectional view of the display device DD corresponding to line I-I' in FIG. 4A. Some configurations of the display device DD, for example, an anti-reflective layer 300, an adhesive layer PSA, and a window WM in FIG. 2 are not illustrated in FIG. 5.

In an embodiment, a pixel driver PC that drives a light-emitting element LD may include a plurality of pixel driving elements. The pixel driver PC may include a plurality of transistors S-TFT and O-TFT and a capacitor Cst. FIG. 5 exemplarily illustrates a silicon transistor S-TFT and an oxide transistor O-TFT as examples of a transistor. The pixel driver PC in FIG. 5 is only an embodiment, and a configuration of the pixel driver PC is not necessarily limited thereto. The pixel driver PC may include only one typed transistor of the silicon transistor S-TFT and the oxide transistor O-TFT.

In an embodiment and referring to FIG. 5, a base layer 110 is illustrated as a single layer. The base layer 110 may include a synthetic resin such as polyimide. The base layer 110 may be formed by applying a synthetic resin layer on a working substrate (or carrier substrate). After a display module DM is completed by performing the following processes, the working substrate may be removed. In an embodiment, the base layer 110 may have a multi-layered structure including a first synthetic resin layer, at least one inorganic layer, and a second synthetic resin layer.

In an embodiment and referring to FIG. 5, a barrier layer 10*br* may be disposed on the base layer 110. The barrier layer 10*br* may prevent foreign matters from being introduced from the outside. The barrier layer 10*br* may include at least one inorganic layer. The barrier layer 10*br* may include a silicon oxide layer and a silicon nitride layer. The silicon oxide layer and the silicon nitride layer may be each provided in plurality, and may be alternately stacked.

In an embodiment, the barrier layer 10*br* may include a lower barrier layer 10*br*1 and an upper barrier layer 10*br*2. A first shielding electrode BMLa may be disposed between the lower barrier layer 10*br*1 and the upper barrier layer 10*br*2. The first shielding electrode BMLa may be disposed to correspond to the silicon transistor S-TFT. The first shielding electrode BMLa may include metal, for example, molybdenum.

In an embodiment, the first shielding electrode BMLa may receive a bias voltage. The first shielding electrode BMLa may receive a first power voltage. The first shielding electrode BMLa may block an electric potential due to a polarization phenomenon from affecting the silicon transistor S-TFT. The first shielding electrode BMLa may block external light from reaching the silicon transistor S-TFT. The first shielding electrode BMLa according to an embodiment may be a floating electrode having a form isolated from another electrode or line.

In an embodiment, a buffer layer 10*bf* may be disposed on the barrier layer 10*br*. The buffer layer 10*bf* may prevent metal atoms or impurities from diffusing from the base layer 110 to a first semiconductor pattern SC1 there above. The buffer layer 10*bf* may include at least one inorganic layer. The buffer layer 10*bf* may include a silicon oxide layer and a silicon nitride layer.

In an embodiment, the first semiconductor pattern SC1 may be disposed on the buffer layer 10*bf*. The first semiconductor pattern SC1 may include silicon semiconductor. For example, the silicon semiconductor may include amorphous silicon, polycrystalline silicon, or the like. For example, the first semiconductor pattern SC1 may include low-temperature polysilicon.

In an embodiment, the first semiconductor pattern SC1 may have an electric property different according to whether or not being doped. The first semiconductor pattern SC1 may include a first region having a high conductivity and a second region having a low conductivity. The first region may be doped with an N-type dopant or a P-type dopant. The second region may be a non-doped region or a region doped at a lower concentration than the first region. A source region SE1, a channel region AC1 (or active region), and a drain region DE1 of the silicon transistor S-TFT may be formed from the first semiconductor pattern SC1. The source region SE1 and the drain region DE1 may extend from the channel region AC1 on a cross-section in opposite directions.

In an embodiment, a first insulating layer 10 may be disposed on the buffer layer 10*bf*. The first insulating layer 10 may cover the first semiconductor pattern SC1. The first insulating layer 10 may be an inorganic layer. The first insulating layer 10 may be a single-layered silicon oxide layer. Not only the first insulating layer 10 but also an inorganic layer of a driving element layer 120 to be described later may have a single-layered or multi-layered structure, and may include at least one of the materials described above, but the invention is not limited thereto.

In an embodiment, a gate GT1 of the silicon transistor S-TFT is disposed on the first insulating layer 10. The gate GT1 may be a portion of a metal pattern. The gate GT1 overlaps the channel region AC1. The gate GT1 may be a mask in a process in which the first semiconductor pattern SC1 is doped. A first electrode CE10 of the storage capacitor Cst is disposed on the first insulating layer 10. Unlike what is illustrated in FIG. 5, in another embodiment, the first electrode CE10 and the gate GT1 may have an integrated shape.

In an embodiment, a second insulating layer 20 may be disposed on the first insulating layer 10, and may cover the gate GT1. In an embodiment, an upper electrode overlapping the gate GT1 may be further disposed on the second insulating layer 20. A second electrode CE20 overlapping the first electrode CE10 may be disposed on the second insulating layer 20. The upper electrode may have an integrated shape with the second electrode CE20 on a plane.

In an embodiment, a second shielding electrode BMLb is disposed on the second insulating layer 20. The second shielding electrode BMLb may be disposed to correspond to the oxide transistor O-TFT. In an embodiment, the second shielding electrode BMLb may be omitted. According to an embodiment, the first shielding electrode BMLa may extend to a lower portion of the oxide transistor O-TFT to replace the second shielding electrode BMLb.

In an embodiment, a third insulating layer 30 may be disposed on the second insulating layer 20. A second semiconductor pattern SC2 may be disposed on the third insulating layer 30. The second semiconductor pattern SC2 may include a channel region AC2 of the oxide transistor O-TFT. The second semiconductor pattern SC2 may include metal oxide semiconductor. The second semiconductor pattern SC2 may include transparent conductive oxide (TCO) such as indium-tin oxide (ITO), indium-zinc oxide (IZO), indium-gallium-zinc oxide (IGZO), zinc oxide ($ZnO_x$), or indium oxide ($In_2O_3$).

In an embodiment, the metal oxide semiconductor may include a plurality of regions SE2, AC2, and DE2 divided according to whether or not the transparent conductive oxide is reduced. A region in which the transparent conductive oxide is reduced has a high conductivity than a region (hereinafter, an unreduced region) in which the transparent conductive oxide is not reduced. The reduced region may serve as a source/drain of a transistor or a signal line. The unreduced region substantially corresponds to a semiconductor region (or channel) of the transistor. A fourth insulating layer 40 may be disposed on the third insulating layer 30. As illustrated in FIG. 5, the fourth insulating layer 40 may cover the second semiconductor pattern SC2. In an embodiment, the fourth insulating layer 40 may overlap a gate GT2 of the oxide transistor O-TFT, and may be an insulating pattern exposed by a source region SE2 and a drain region DE2 of the oxide transistor O-TFT.

In an embodiment, the gate GT2 of the oxide transistor O-TFT is disposed on the fourth insulating layer 40. The gate GT2 of the oxide transistor O-TFT may be a portion of a metal pattern. The gate GT2 of the oxide transistor O-TFT overlaps the channel region AC2. A fifth insulating layer 50 may be disposed on the fourth insulating layer 40, and may cover the gate GT2. Each of the first insulating layer 10 to the fifth insulating layer 50 may be an inorganic layer.

In an embodiment, a first connection pattern CNP1 and a second connection pattern CNP2 may be disposed on the fifth insulating layer 50. The first connection pattern CNP1 and the second connection pattern CNP2 may be formed through the same process, thereby having the same material and stack structure. The first connection pattern CNP1 may be connected to the drain region DE1 of the silicon transistor S-TFT through a first pixel contact hole PCH1 penetrating the first to fifth insulating layers 10, 20, 30, 40, and 50, respectively. The second connection pattern CNP2 may be connected to the second sensing electrodes SE2 of the oxide transistor O-TFT through a second pixel contact hole PCH2 penetrating the fourth and fifth insulating layers 40 and 50, respectively. A connection relationship of the first connection pattern CNP1 and the second connection pattern CNP2 with respect to the silicon transistor S-TFT and the oxide transistor O-TFT is not necessarily limited thereto.

In an embodiment, a sixth insulating layer 60 may be disposed on the fifth insulating layer 50. A third connection pattern CNP3 may be disposed on the sixth insulating layer 60. The third connection pattern CNP3 may be connected to the first connection pattern CNP1 through a third pixel contact hole PCH3 penetrating the sixth insulating layer 60. Data lines DL may be disposed on the sixth insulating layer 60. A seventh insulating layer 70 may be disposed on the sixth insulating layer 60 to cover the third connection pattern CNP3 and the data lines DL. The third connection pattern CNP3 and the data lines DL may be formed through the same process, thereby having the same material and stack structure. Each of the sixth insulating layer 60 and the seventh insulating layer 70 may be an organic layer.

In an embodiment, the light-emitting element LD may include an anode AE (or first electrode), a light-emitting layer EL, and a cathode CE (or second electrode). The anode AE of the light-emitting element LD may be disposed on the seventh insulating layer 70. The anode AE may be a (semi-) transmissive electrode or a reflective electrode. The anode AE may include a stack structure of ITO/Ag/ITO sequentially stacked. A position of the anode AE and a position of the cathode CE may be changed to each other.

In an embodiment, a pixel-defining film PDL may be disposed on the seventh insulating layer 70. The pixel-defining film PDL may be an organic layer. The pixel-defining film PDL may have a property of absorbing light. For example, the pixel-defining film PDL may have a black color. The pixel-defining film PDL may include a black coloring agent. The black coloring agent may include a black pigment or black dye. The black coloring agent may include metal such as carbon black or chromium, or an oxide thereof. The pixel-defining film PDL may correspond to a light-blocking pattern having light-blocking characteristics.

In an embodiment, the pixel-defining film PDL may partially cover the anode AE. For example, an opening PDL-OP partially exposing the anode AE may be defined in the pixel-defining film PDL. A light-emitting region LA1 may be defined to correspond to the opening PDL-OP. FIG. 5 illustrates one light-emitting region LA1 corresponding to the first light-emitting region LA1 in FIG. 4A. The cross-section corresponding to the second light-emitting region LA2 and the third light-emitting region LA3 in FIG. 4A may be also substantially the same as the cross-section in FIG. 5. However, the light-emitting layer EL having a different material from the first light-emitting region LA1 may be disposed in the second light-emitting region LA2 and the third light-emitting region LA3. In addition, referring to the pair of light-emitting regions UP in FIG. 4A, the pixel-defining film PDL is disposed between the third light-emitting region LA3 of the first unit light-emitting region UA1 and the third light-emitting region LA3 of the second unit light-emitting region UA2. The light-emitting layer EL disposed in the third light-emitting region LA3 of the first unit light-emitting region UA1 and the third light-emitting region LA3 of the second unit light-emitting region UA2 may be disposed on the pixel-defining film PDL to be disposed between the third light-emitting region LA3 of the first unit light-emitting region UA1 and the third light-emitting region LA3 of the second unit light-emitting region UA2.

In an embodiment, a hole control layer may be disposed between the anode AE and the light-emitting layer EL. The hole control layer may include a hole transport layer, and may further include a hole injection layer. An electron control layer may be disposed between the light-emitting layer EL and the cathode CE. The electron control layer may include an electron transport layer, and may further include an electron injection layer.

In an embodiment, an encapsulation layer 140 may cover the light-emitting element LD. The encapsulation layer 140 may include an inorganic encapsulation layer 141, an organic encapsulation layer 142, and an inorganic encapsulation layer 143 sequentially stacked, but layers constituting the encapsulation layer 140 are not limited thereto. The inorganic encapsulation layers 141 and 143 may include a silicon nitride layer, a silicon oxynitride layer, a silicon oxide layer, a titanium oxide layer, an aluminum oxide layer, or the like. Each of the inorganic encapsulation layers 141 and 143 may have a multi-layered structure. The organic encapsulation layer 142 may include an acrylic organic layer, but the invention is not limited thereto.

In an embodiment, an input sensor 200 includes a plurality of conductive patterns. The input sensor 200 may include at least one conductive layer (or at least one conductive sensor layer) including the plurality of conductive patterns, and at least one insulating layer (or at least one insulating sensor layer). In an embodiment, the input sensor 200 may include a first insulating layer 210 (or first insulating sensor layer), a first conductive layer 220 (or first conductive sensor layer), a second insulating layer 230 (or second insulating sensor layer), a second conductive layer 240 (or second conductive sensor layer), and a third insulating layer 250 (or third insulating sensor layer). FIG. 5 briefly illustrates a plurality of conductive patterns included in each of the first conductive layer 220 and the second conductive layer 240.

In an embodiment, the first insulating layer 210 may be directly disposed on the display panel 100. The first insulating layer 210 may be an inorganic layer including at least any one of silicon nitride, silicon oxynitride, or silicon oxide. Each of the first conductive layer 220 and the second conductive layer 240 may have a single-layered structure, or a multi-layered structure stacked along the third direction DR3. Each of the first conductive layer 220 and the second conductive layer 240 may include conductive lines defining an electrode having a mesh shape. A conductive line of the first conductive layer 220 and a conductive line of the second conductive layer 240 may be connected through a contact hole penetrating the second insulating layer 230, or may not be connected to each other, according to positions thereof.

In an embodiment, the first conductive layer 220 and the second conductive layer 240 having a single-layered structure may include a metal layer or a transparent conductive layer. The metal layer may include molybdenum, silver, titanium, copper, aluminum, or an alloy thereof. The transparent conductive layer may include transparent conductive oxide such as indium-tin oxide (ITO), indium-zinc oxide (IZO), zinc oxide ($ZnO_x$), indium-zinc-tin oxide (IZTO), or the like. Additionally, the transparent conductive oxide may include conductive polymer such PEDOT, metal nanowire, graphene, or the like.

In an embodiment, the first conductive layer 220 and the second conductive layer 240 having a multi-layered structure may include metal layers. For example, the metal layers may have a three-layered structure of titanium/aluminum/titanium. A conductive layer of the multi-layered structure may include at least one metal layer and at least one transparent conductive layer. The second insulating layer 230 may be disposed between the first conductive layer 220 and the second conductive layer 240. The second insulating layer 230 disposed between the first conductive layer 220 and the second conductive layer 240 may be described as "an insulating sensing layer" in the present specification. The third insulating layer 250 may cover the second conductive layer 240. In an embodiment of the invention, the third insulating layer 250 may be omitted. The second insulating layer 230 and the third insulating layer 250 may include an inorganic layer or an organic layer.

Figure 6A:
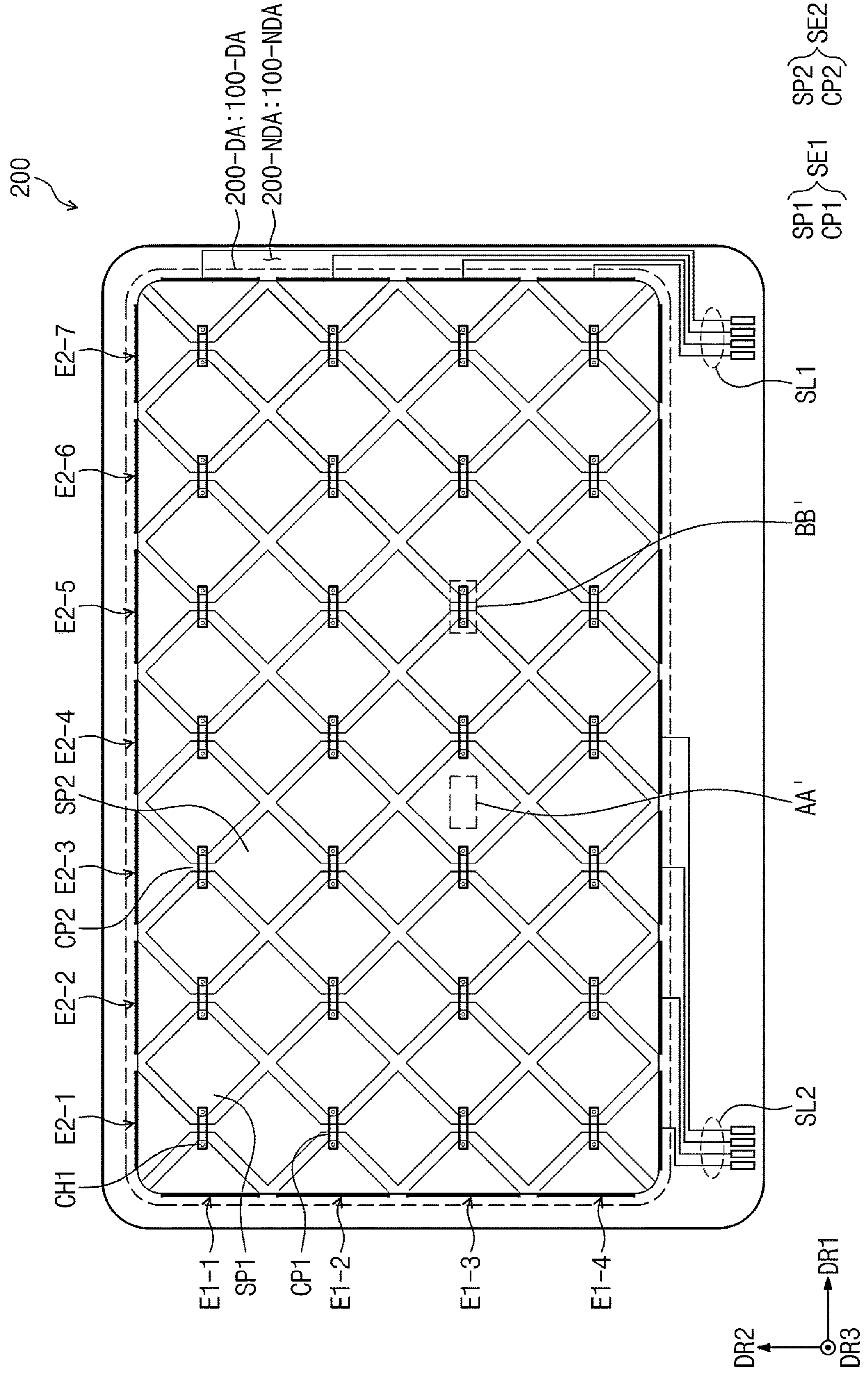
FIG. 6A is a plan view of an input sensor, according to an embodiment.
Figure 6B:
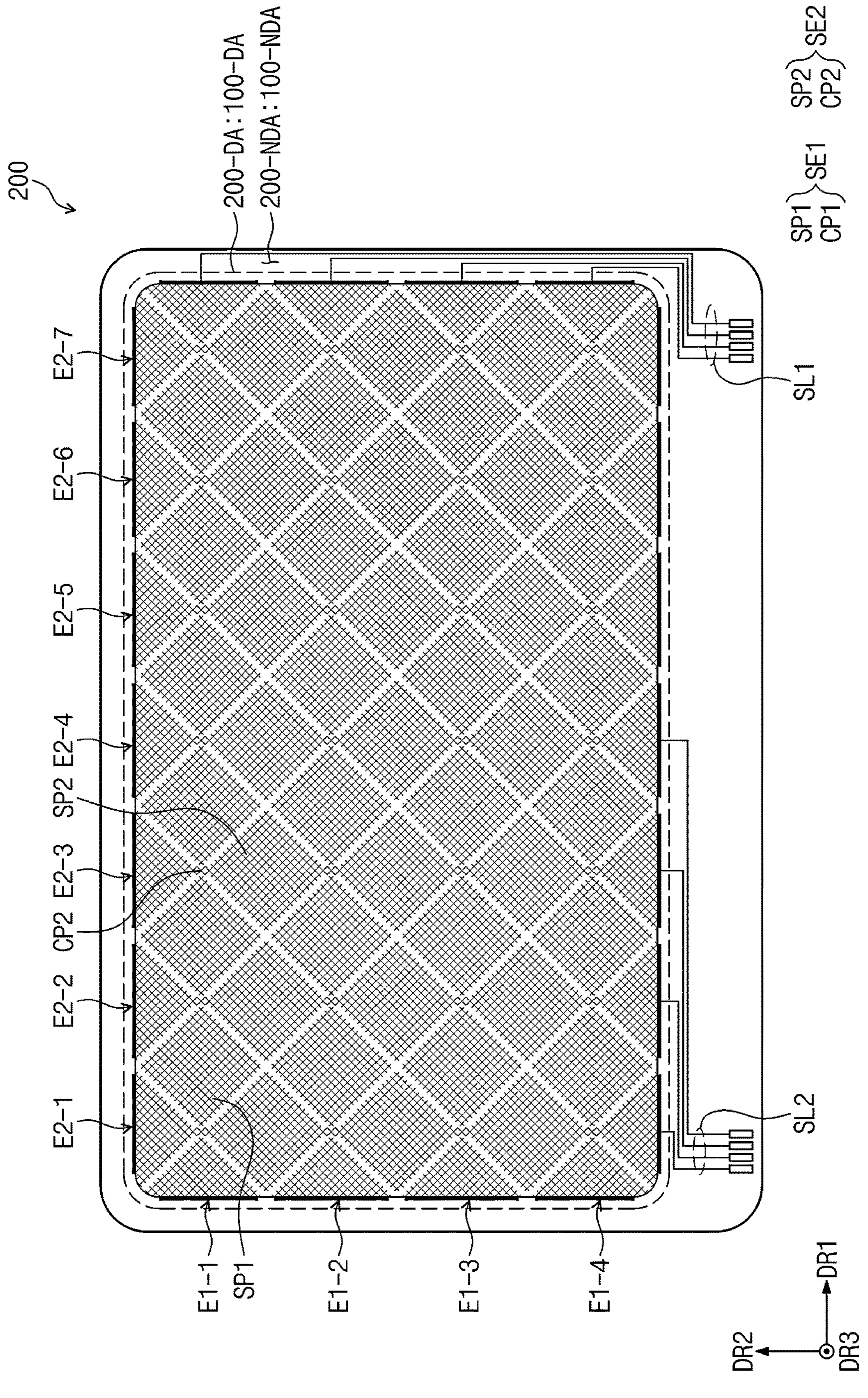
FIG. 6B is a plan view illustrating some configurations of an input sensor, according to an embodiment.

FIG. 6A is a plan view of an input sensor 200, according to an embodiment. FIG. 6B is a plan view of some configurations of the input sensor 200, according to an embodiment. FIG. 6B illustrates some conductive patterns, disposed on the same layer, of a plurality of conductive patterns included in the input sensor 200, according to an embodiment.

In an embodiment and as illustrated in FIG. 6A, the input sensor 200 includes a sensing region 200-DA and a non-sensing region 200-NDA disposed adjacent to the sensing region 200-DA. The sensing region 200-DA and the non-sensing region 200-NDA respectively correspond to a display region 100-DA and a non-display region 100-NDA illustrated in FIG. 5.

In an embodiment, the input sensor 200 includes the plurality of conductive patterns described above. The plurality of conductive patterns include first sensing electrodes SE1 (or first sensing electrodes), second sensing electrodes SE2 (or second sensing electrodes), first signal lines SL1 (or first sensor signal lines), and second signal lines SL2 (or second sensor signal lines).

In an embodiment, the first sensing electrodes SE1 and the second sensing electrodes SE2 crossing each other are disposed in the sensing region 200-DA. The first signal lines SL1 connected to the first sensing electrodes SE1 and the second signal lines SL2 electrically connected to the second sensing electrodes SE2 are disposed in the non-sensing region 200-NDA. Any one of the first signal lines SL1 and the second signal lines SL2 transmits a driving signal for sensing an external input from an external circuit to corresponding electrodes, and the other one outputs a sensing signal. A capacitance change between the first sensing electrodes SE1 and the second sensing electrodes SE2 is measured on the basis of the sensing signal. In an embodiment, an input sensor having a mutual-capacitance method is exemplarily illustrated, but the invention is not limited thereto, and an input sensor having a self-capacitance method may be applied. The input sensor having a self-capacitance method may include one typed sensing electrodes.

In an embodiment, the first sensing electrodes SE1 may be provided in multiple rows. The first sensing electrodes SE1 may include a first row sensing electrode E1-1, a second row sensing electrode E1-2, a third row sensing electrode E1-3, and a fourth row sensing electrode E1-4. Unlike what is illustrated in FIG. 6A, in another embodiment, the first sensing electrodes SE1 may include sensing electrodes having two or three rows, or five or more rows.

In an embodiment, the second sensing electrodes SE2 may be provided in multiple columns. The second sensing electrodes SE2 may include a first column sensing electrode E2-1, a second column sensing electrode E2-2, a third column sensing electrode E2-3, a fourth column sensing electrode E2-4, a fifth column sensing electrode E2-5, a sixth column sensing electrode E2-6, and a seventh column sensing electrode E2-7. Unlike what is illustrated in FIG. 6A, in another embodiment, the second sensing electrodes SE2 may include sensing electrodes having six or less columns, or eight or more columns.

In an embodiment, the second sensing electrodes SE2 may include second sensing patterns SP2 and connection patterns CP2. The second sensing patterns SP2 may have a greater area than the connection patterns CP2, and may have a rhombus shape. The connection patterns CP2 are each disposed between two adjacent second sensing patterns SP2 of the second sensing patterns SP2. The connection patterns CP2 may have a relatively shorter length than the second sensing patterns SP2.

In an embodiment, each of the first sensing electrodes SE1 may include the first sensing patterns SP1 and the bridge patterns CP1. Two adjacent first sensing patterns SP1 may be connected to each other by two bridge patterns CP1, but a number of bridge patterns connecting each of two adjacent first sensing patterns SP1 is not limited thereto.

In an embodiment, each of the first signal lines SL1 and the second signal lines SL2 in FIG. 6A may be formed from the first conductive layer 220 in FIG. 5. However, the invention is not limited thereto, and each of the first signal lines SL1 and the second signal lines SL2 may be formed from the second conductive layer 240. The first signal lines SL1 and the second signal lines SL2 may have a double line structure including all of a line formed from the first conductive layer 220 and a line formed from the second conductive layer 240.

In an embodiment and referring to FIGS. 6A and 6B, the first sensing patterns SP1 and the second sensing electrodes SE2 may be disposed on the same layer. The bridge patterns CP1 may be disposed on a layer different from the first sensing patterns SP1 and the second sensing electrodes SE2. In the input sensor 200, according to an embodiment, the bridge patterns CP1 may be included in the first conductive layer 220 described in FIG. 5 and disposed on the first insulating layer 210, and the first sensing patterns SP1 and the second sensing electrodes SE2 may be included in the second conductive layer 240 and disposed on the second insulating layer 230. In another embodiment, the bridge patterns CP1 may be included in the second conductive layer 240 and disposed on the second insulating layer 230, and the first sensing patterns SP1 and the second sensing electrodes SE2 may be included in the first conductive layer 220 and disposed on the first insulating layer 210. Meanwhile, although not shown in detail in FIG. 6B, some of the bridge patterns CP1 may be disposed on the same layer as the first sensing patterns SP1 and the second sensing electrodes SE2. A shape and layer structure of the bridge patterns CP1 will be described in detail in FIG. 8, etc.

In an embodiment, as illustrated in FIG. 6B, each of the first sensing electrodes SE1 and the second sensing electrodes SE2 may have a mesh shape in which a plurality of opening regions are defined. For example, the plurality of opening regions may overlap corresponding light-emitting regions of a plurality of light-emitting regions LA1, LA2, and LA3. The second sensing electrodes SE2 cross the first sensing electrodes SE1. The mesh shape of each of the first sensing electrodes SE1 and the second sensing electrodes SE2 will be described in FIG. 7, FIG. 8, etc.

In an embodiment, any one of the first sensing electrodes SE1 and the second sensing electrodes SE2 may have an integrated shape. In an embodiment, the second sensing electrodes SE2 having an integrated shape are exemplarily illustrated.

Figure 7:
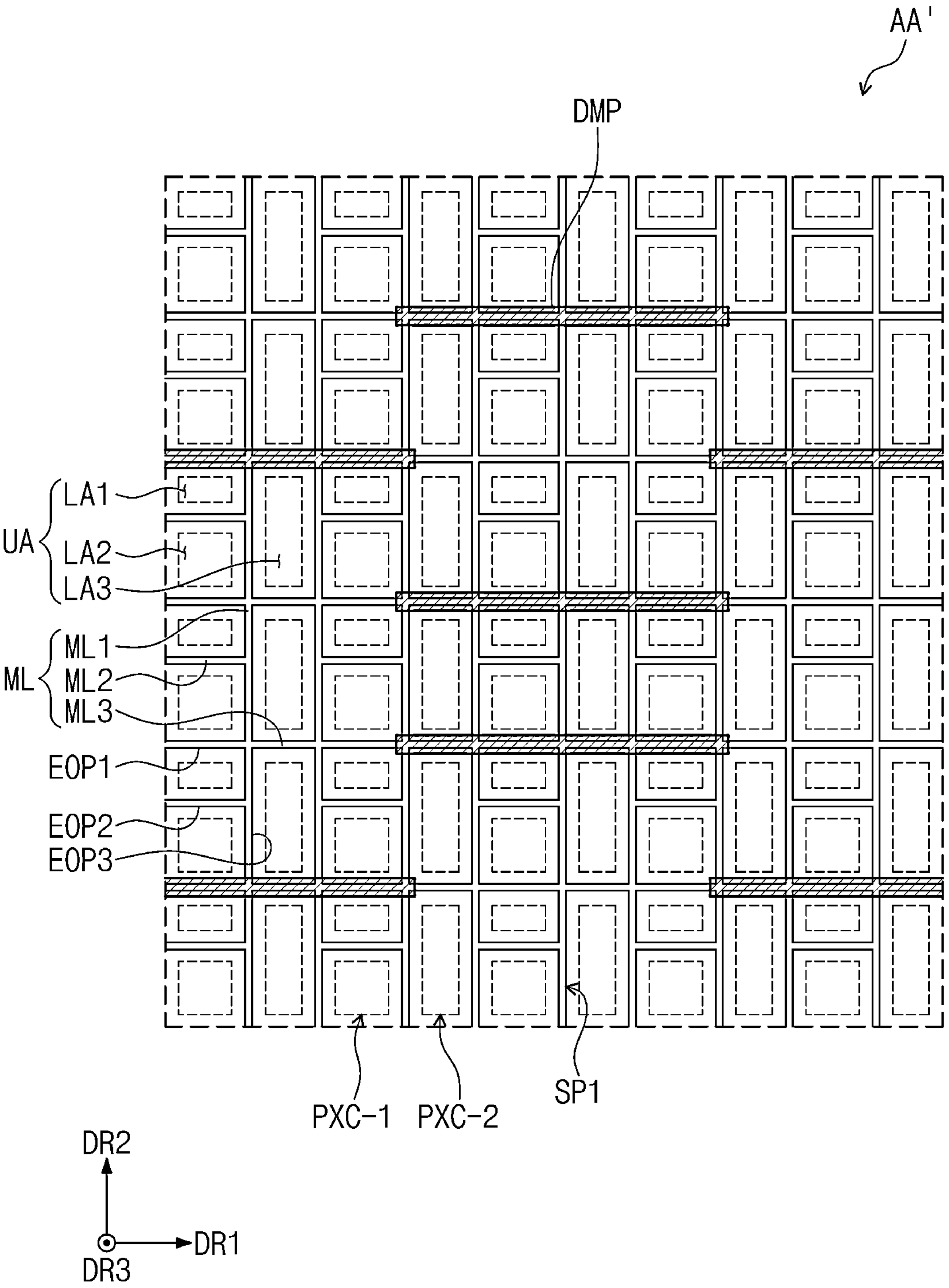
FIG. 7 is an enlarged plan view of a portion of an input sensor, according to an embodiment.
Figure 8:
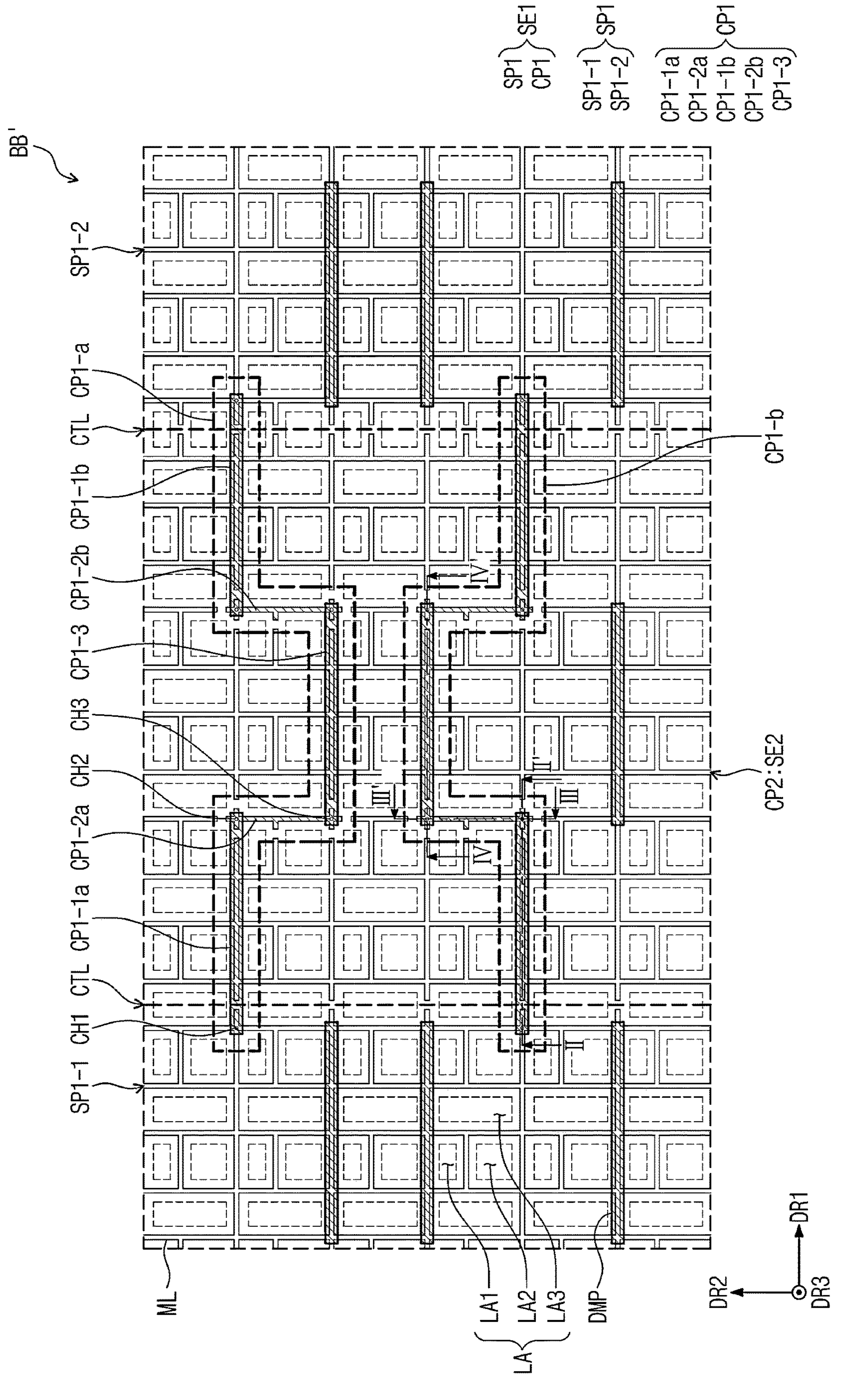
FIG. 8 is an enlarged plan view of a portion of an input sensor, according to an embodiment.

FIG. 7 is an enlarged plan view of a portion of an input sensor, according to an embodiment. FIG. 8 is an enlarged plan view of a portion of the input sensor, according to an embodiment. The portion corresponding to region AA' illustrated in FIG. 6A is illustrated in an enlarged view in FIG. 7. The portion corresponding to region BB' illustrated in FIG. 6A is illustrated in an enlarged view in FIG. 8.

In an embodiment and referring to FIGS. 6A and 7 together, a plurality of opening regions EOP1, EOP2, and EOP3 may be defined in each of the first sensing patterns SP1.

In an embodiment, the plurality of opening regions EOP1, EOP2, and EOP3 may include a first opening region EOP1 corresponding to (or overlapping) the first light-emitting region LA1, a second opening region EOP2 corresponding to the second light-emitting region LA2, and a third opening region EOP3 corresponding to the third light-emitting region LA3. In the present specification, a pixel column in which the first light-emitting region LA1 and the second light-emitting region LA2 are alternately disposed along the second direction DR2 may be referred to as a first unit pixel column PXC-1. A pixel column in which the third light-emitting region LA3 is disposed along the second direction DR2 may be referred to as a second pixel column PXC-2.

In an embodiment, the first light-emitting region LA1 may be disposed inside the first opening region EOP1, and the second light-emitting region LA2 may be disposed inside the second opening region EOP2. The third light-emitting region LA3 may be disposed inside the third opening region EOP3. Meanwhile, in another embodiment, two third light-emitting region LA3 may be disposed inside the third opening region EOP3.

In an embodiment, each of the first sensing patterns SP1 may include a plurality of mesh lines ML defining the plurality of opening regions EOP1, EOP2, and EOP3. The plurality of mesh lines ML may include a first mesh line ML1, a second mesh line ML2, and a third mesh line ML3. The first mesh line ML1 may extend in the second direction DR2. The second mesh line ML2 and the third mesh line ML3 may each extend in the first direction DR1. Meanwhile, the second mesh line ML2 may be a line component directed parallel to the first opening region EOP1 and the second opening region EOP2 in the second direction DR2, and the third mesh line ML3 may be a line component directed parallel to the third opening region EOP3 in the second direction DR2. Meanwhile, the first mesh line ML1, the second mesh line ML2, and the third mesh line ML3 may have the same thickness. However, the invention is not limited thereto, and any one of the mesh lines ML may be thicker than the other mesh lines ML. For example, the first mesh line ML1 and the second mesh line ML2 may each have a first thickness, and the third mesh line ML3 may have a second thickness greater than the first thickness.

In an embodiment, the plurality of opening regions EOP1, EOP2, and EOP3 may respectively have greater planar areas than overlapping light-emitting regions. For example, a planar area of the first opening region EOP1 may be greater than an area of the first light-emitting region LA1, a planar area of the second opening region EOP2 may be greater than an area of the second light-emitting region LA2, and a planar area of the third opening region EOP3 may be greater than an area of the third light-emitting region LA3. Due to this, the plurality of mesh lines ML defining the plurality of opening regions EOP1, EOP2, and EOP3 may not reduce light-emitting efficiencies of the light-emitting regions LA1, LA2, and LA3.

In an embodiment, a disposition and a shape of the first to third mesh lines ML1, ML2, and ML3, respectively, may be variously changed according to a disposition and planar areas of the plurality of opening regions EOP1, EOP2, and EOP3 defined in the mesh lines ML. In addition, the disposition and the planar areas of the plurality of opening regions EOP1, EOP2, and EOP3 may be variously changed according to a disposition and areas of the corresponding light-emitting regions LA1, LA2, and LA3.

In an embodiment and for convenience of description, the first to third mesh lines ML1, ML2, and ML3, respectively, are separately described, but the first to third mesh lines ML1, ML2, and ML3, respectively, may be connected to each other to have an integrated shape. That is, the first to third mesh lines ML1, ML2, and ML3, respectively, may be formed by patterning the plurality of opening regions EOP1, EOP2, and EOP3 on an integrated conductive layer. In addition, FIG. 7 exemplarily illustrates the opening regions EOP1, EOP2, and EOP3 defined in the first sensing patterns SP1 and the mesh lines ML defining the opening regions EOP1, EOP2, and EOP3, but the opening regions EOP1, EOP2, and EOP3 and the mesh lines ML having the same shape may be included in the second sensing patterns SP2.

In an embodiment and referring to FIGS. 6A to 8, the input sensor 200 includes a plurality of conductive patterns, and the plurality of conductive patterns include the first sensing electrodes SE1 and the second sensing electrodes SE2. The first sensing electrodes SE1 include the first sensing patterns SP1 and the bridge patterns CP1. The second sensing electrodes SE2 may include the second sensing patterns SP2 and the connection patterns CP2. FIG. 8 illustrates an enlarged planar shape of a (1-1)-th sensing pattern SP1-1, a (1-2)-th sensing patterns SP1-2, and the bridge pattern CP1 included in the first sensing electrodes SE1, and the connection pattern CP2 included in the second sensing electrodes SE2.

In an embodiment, in the input sensor 200, a boundary portion CTL may be defined between the first sensing patterns SP1 and the second sensing electrodes SE2. The boundary portion CTL may be a portion in which the mesh lines ML is at least partially removed. The boundary portion CTL may be provided to each other to insulate the first sensing patterns SP1 and the second sensing electrodes SE2.

In an embodiment, each of the second sensing patterns SP2 and the connection pattern CP2 included in the second sensing electrode SE2 may include the mesh lines ML, and may have an integrated shape. The connection pattern CP2 may be disposed between two adjacent second sensing patterns SP2, and may have the integrated shape with each of the two second sensing patterns SP2. Each of the plurality of second sensing patterns SP2 and the connection pattern CP2 illustrated in FIG. 6A may include the mesh lines ML, and the two adjacent second sensing patterns SP2 of the second sensing patterns SP2, and the connection pattern CP2 may have the integrated shape.

In an embodiment, the input sensor 200 may further include a plurality of dummy patterns DMP. The plurality of dummy patterns DMP may be provided in plurality, and may be disposed in the entire sensing region 200-DA. Each of the dummy patterns DMP may at least partially overlap the first sensing electrode SE1 and the second sensing electrode SE2 on a plane. Each of the dummy patterns DMP may at least partially overlap the first sensing pattern SP1, the second sensing pattern SP2, and the connection pattern CP2 on a plane. Since, in the input sensor according to an embodiment, the dummy patterns DMP corresponding to a bridge pattern are provided to the entire sensing region, a limitation that only a portion in which the bridge pattern CP1 is disposed has an unusually high reflectance may be prevented, thereby preventing a failure of being partially brightly viewed from the outside.

In an embodiment, the bridge pattern CP1 electrically connects two adjacent first sensing patterns SP1. The bridge pattern CP1 overlaps a first contact hole CH1 on a plane, and electrically connects the two adjacent first sensing patterns SP1 through the first contact hole CH1.

In an embodiment, the two adjacent first sensing patterns SP1 may be connected by two bridge patterns CP1. The bridge pattern CP1 may connect a (1-1)-th sensing pattern SP1-1 and a (1-2)-th sensing pattern SP1-2 disposed adjacent to each other. As illustrated in FIG. 8, the bridge pattern CP1 may include a first sub-bridge pattern CP1-*a* and a second sub-bridge pattern CP1-*b* connecting the (1-1)-th sensing pattern SP1-1 and the (1-2)-th sensing pattern SP1-2 disposed adjacent to each other in the first direction DR1. The first sub-bridge pattern CP1-*a* and the second sub-bridge pattern CP1-*b* may be spaced apart from each other along the second direction DR2. The first sub-bridge pattern CP1-*a* and the second sub-bridge pattern CP1-*b* may each overlap the connection pattern CP2 of the second sensing electrodes SE2. The first sub-bridge pattern CP1-*a* and the second sub-bridge pattern CP1-*b* may respectively include first bridge patterns CP1-1*a* and CP1-1*b* and second bridge patterns CP1-2*a* and CP1-2*b* to be described later. Each of the first sub-bridge pattern CP1-*a* and the second sub-bridge pattern CP1-*b* may further include a third bridge pattern CP1-3 to be described later.

In an embodiment, the bridge pattern CP1 includes the first bridge patterns CP1-1*a* and CP1-1*b* overlapping the first contact hole CH1, and the second bridge patterns CP1-2*a* and CP1-2*b* overlapping the second contact hole CH2. The first bridge patterns CP1-1*a* and CP1-1*b* overlap the first contact hole CH1 and the second contact hole CH2.

In an embodiment, the first bridge patterns CP1-1*a* and CP1-1*b* overlap the first contact hole CH1, and is connected to any one corresponding to the first sensing patterns SP1 by the first contact hole CH1. The first bridge patterns CP1-1*a* and CP1-1*b* partially overlap the first sensing patterns SP1. The first bridge patterns CP1-1*a* and CP1-1*b* may partially overlap the boundary portion CTL defined between the first sensing electrodes SE1 and the second sensing electrodes SE2. The first bridge patterns CP1-1*a* and CP1-1*b* may have rod shapes extending along the first direction DR1.

In an embodiment, the first bridge patterns CP1-1*a* and CP1-1*b* may include the (1-1)-th bridge pattern CP1-1*a* and the (1-2)-th bridge pattern CP1-1*b*. The (1-1)-th bridge pattern CP1-1*a* may be connected to the (1-1)-th sensing patterns SP1-1 by the first contact hole CH1, and the (1-2)-th bridge pattern CP1-1*b* may be connected to the (1-2)-th sensing patterns SP1-2 by the first contact hole CH1. The (1-1)-th bridge pattern CP1-1*a* and the (1-2)-th bridge pattern CP1-1*b* may be spaced apart from each other on a plane. The (1-1)-th bridge pattern CP1-1*a* and the (1-2)-th bridge pattern CP1-1*b* may be spaced apart from each other on a plane, but may be electrically connected through the second bridge patterns CP1-2*a* and CP1-2*b* and the third bridge pattern CP1-3 to be described later.

In an embodiment, the second bridge patterns CP1-2*a* and CP1-2*b* overlap the second contact hole CH2, and are connected to the first bridge patterns CP1-1*a* and CP1-1*b* by the second contact hole CH2. The second bridge patterns CP1-2*a* and CP1-2*b* may include a (2-1)-th bridge pattern CP1-2*a* and a (2-2)-th bridge pattern CP1-2*b*. The (2-1)-th bridge pattern CP1-2*a* may be connected to the (1-1)-th bridge pattern CP1-1*a* by the second contact hole CH2, and the (2-2)-th bridge pattern CP1-2*b* may be connected to the (1-2)-th bridge pattern CP1-1*b* by the second contact hole CH2. The second bridge patterns CP1-2*a* and CP1-2*b* may extend along the second direction DR2. The second bridge patterns CP1-2*a* and CP1-2*b* may have a mesh line structure including a main portion extending along the second direction DR2, and a protrusion portion protruding from the main portion along the first direction DR1.

In an embodiment, the (2-1)-th bridge pattern CP1-2*a* and the (2-2)-th bridge pattern CP1-2*b* may be spaced apart from each other on a plane. The (2-1)-th bridge pattern CP1-2*a* and the (2-2)-th bridge pattern CP1-2*b* may be spaced apart from each other on a plane, but may be electrically connected to each other through the third bridge pattern CP1-3 to be described later.

In an embodiment, the bridge pattern CP1 may further include the third bridge pattern CP1-3 overlapping a third contact hole CH3. The third bridge pattern CP1-3 may at least partially overlap the second bridge patterns CP1-2*a* and CP1-2*b*, and may be at least partially connected to the second bridge patterns CP1-2*a* and CP1-2*b* through the third contact hole CH3. The third bridge pattern CP1-3 may be connected to at least one of the (2-1)-th bridge pattern CP1-2*a* and the (2-2)-th bridge pattern CP1-2*b*. In an embodiment, the third bridge pattern CP1-3 may be connected to each of the (2-1)-th bridge pattern CP1-2*a* and the (2-2)-th bridge pattern CP1-2*b* through the third contact hole CH3. The third bridge pattern CP1-3 may have a rod shape extending along the first direction DR1.

In an embodiment, the third bridge pattern CP1-3 may overlap the second sensing electrode SE2 on a plane. The third bridge pattern CP1-3 may overlap the connection pattern CP2 included in the second sensing electrode SE2 on a plane.

Figure 9A:
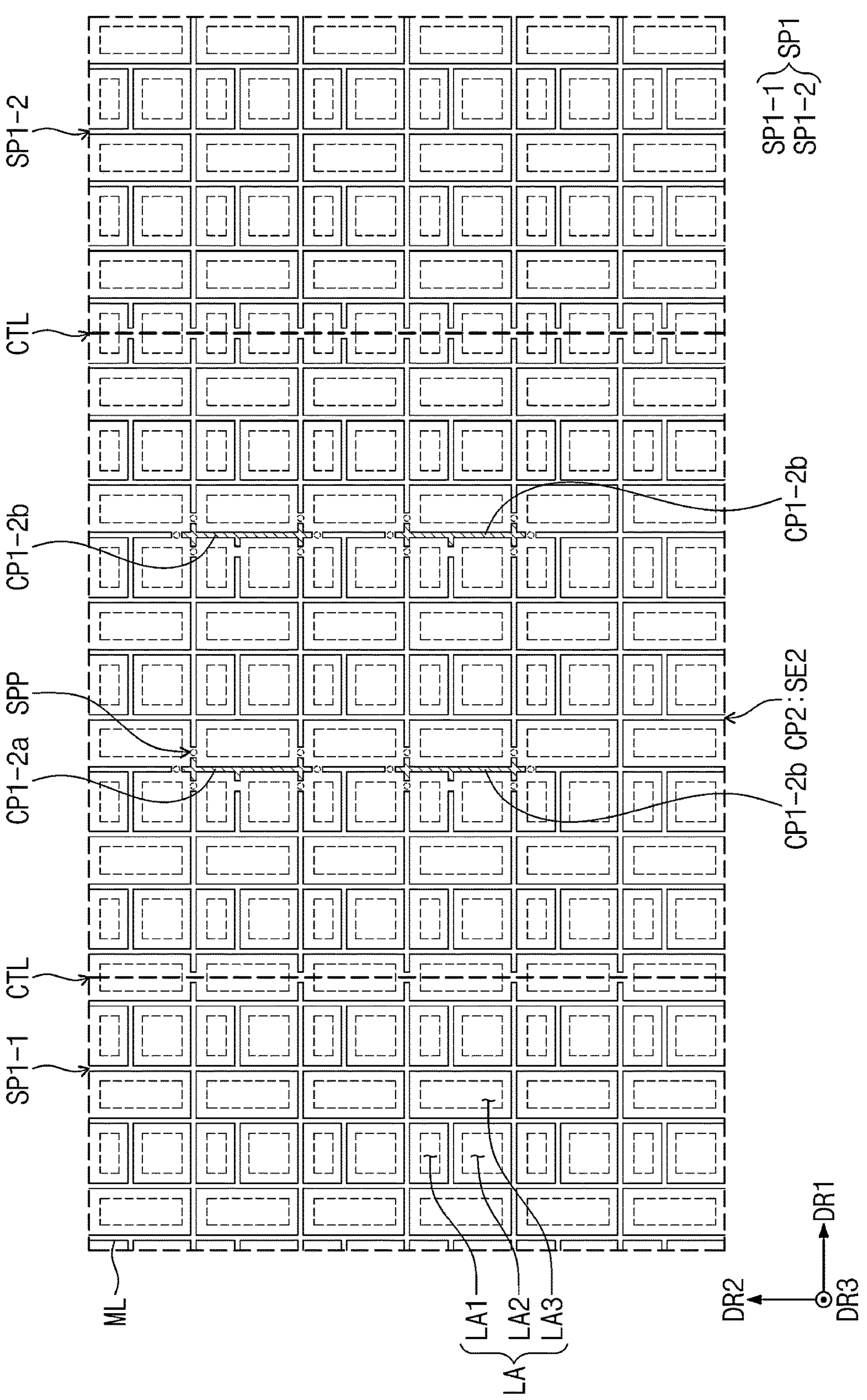
FIG. 9A is a plan view illustrating some configurations of an input sensor, according to an embodiment.
Figure 9B:
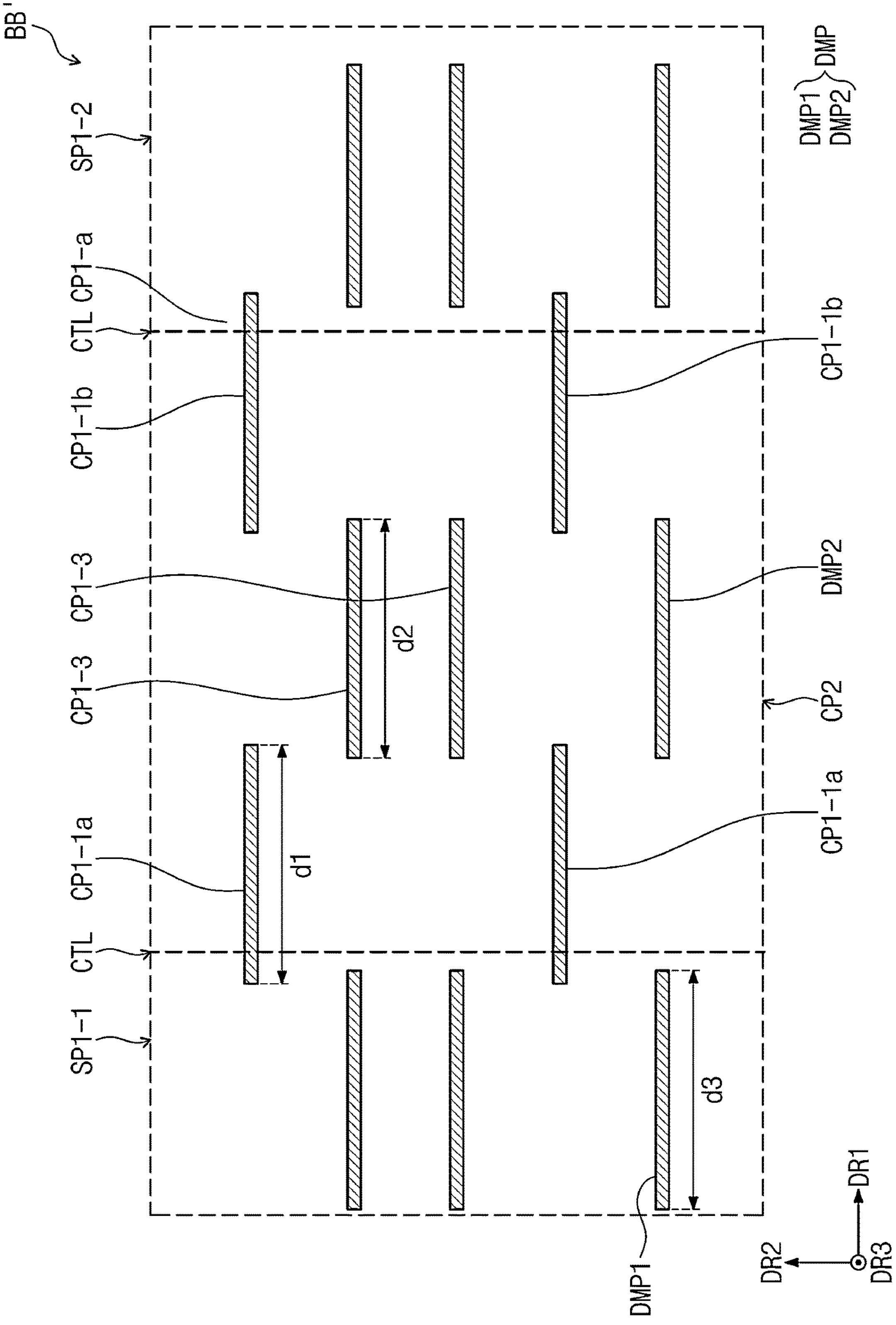
FIG. 9B is a plan view illustrating some configurations of an input sensor, according to an embodiment.

FIGS. 9A and 9B are plan views illustrating some configurations of an input sensor, according to an embodiment. FIGS. 9A and 9B each separately illustrate conductive patterns, disposed on different layers, of a plurality of conductive patterns included in the input sensor, according to an embodiment.

In an embodiment and referring to FIGS. 8, 9A, and 9B together, the second bridge patterns CP1-2*a* and CP1-2*b*, the first sensing pattern SP1, and the second sensing electrodes SE2 of the plurality of conductive patterns described above may be disposed on the same layer. The first bridge patterns CP1-1*a* and CP1-1*b*, the third bridge pattern CP1-3, and the dummy pattern DMP of the plurality of conductive patterns described above may be disposed on the same layer. For example, the first bridge patterns CP1-1*a* and CP1-1*b*, the third bridge pattern CP1-3, and the dummy pattern DMP may be included in the first conductive layer 220 described in FIG. 5 and disposed on the first insulating layer 210, and the second bridge patterns CP1-2*a* and CP1-2*b*, the first sensing pattern SP1, and the second sensing electrode SE2 may be included in the second conductive layer 240 and disposed on the second insulating layer 230. In another embodiment, the first bridge patterns CP1-1*a* and CP1-1*b*, the third bridge pattern CP1-3, and the dummy pattern DMP may be included in the second conductive layer 240 and disposed on the second insulating layer 230, and the second bridge patterns CP1-2*a* and CP1-2*b*, the first sensing pattern SP1, and the second sensing electrode SE2 may be included in the first conductive layer 220 and disposed on the first insulating layer 210.

In an embodiment and as illustrated in FIG. 9A, the second bridge patterns CP1-2*a* and CP1-2*b* may be disposed on the same layer as the second sensing electrode SE2, and may be disposed adjacent to the second sensing electrode SE2. The second bridge patterns CP1-2*a* and CP1-2*b* may be disposed adjacent to the connection pattern CP2 included in the second sensing electrode SE2. The second bridge patterns CP1-2*a* and CP1-2*b* may include a mesh line ML together with the connection pattern CP2, and a cutting portion SPP may be defined between the second bridge patterns CP1-2*a* and CP1-2*b* and the connection pattern CP2. The second bridge patterns CP1-2*a* and CP1-2*b* and the connection pattern CP2 may be spaced apart from each other with the cutting portion SPP disposed therebetween. Meanwhile, after being formed in a form of a single layer having an integrated shape on the same layer, the second bridge patterns CP1-2*a* and CP1-2*b* and the connection pattern CP2 may be patterned to be spaced apart from each other with the cutting portion SPP disposed therebetween in an operation of forming the mesh line ML through a patterning process. The cutting portion SPP may be a portion in which the mesh lines ML are at least partially removed. The cutting portion SPP may be provided to each other to insulate the second bridge patterns CP1-2*a* and CP1-2*b* and the connection pattern CP2.

In an embodiment, the boundary portion CTL may be defined between the first sensing pattern SP1 and the second sensing electrode SE2. The boundary portion CTL may be a portion in which the mesh lines ML are at least partially removed. The boundary portion CTL may be provided to each other to insulate the first sensing pattern SP1 and the second sensing electrode SE2.

In an embodiment, the dummy pattern DMP may at least partially overlap the first sensing electrode SE1 and the second sensing electrode SE2 on a plane. The dummy pattern DMP may overlap any one of the first sensing pattern SP1 and the second sensing pattern SP2 on a plane. In another embodiment, the dummy pattern DMP may overlap the connection pattern CP2 on a plane. The dummy pattern DMP may include a first dummy pattern DMP1 overlapping the first sensing pattern SP1, and a second dummy pattern DMP2 overlapping the second sensing electrode SE2. Meanwhile, although not shown, the dummy pattern DMP may partially overlap the boundary portion CTL.

In an embodiment, the first bridge patterns CP1-1*a* and CP1-1*b*, the third bridge pattern CP1-3, and the dummy pattern DMP may be disposed on the same layer. The first bridge patterns CP1-1*a* and CP1-1*b*, the third bridge pattern CP1-3, and the dummy pattern DMP may each substantially have the same shape on a plane, and may be disposed to be spaced apart from each other at a constant interval. As illustrated in FIG. 9B, the first bridge patterns CP1-1*a* and CP1-1*b*, the third bridge pattern CP1-3, and the dummy pattern DMP may each substantially have the same length in the first direction DR1. Meanwhile, the wording, "substantially the same" in the present specification includes not only a case in which a shape, a length, etc., thereof are physically the same, but also a case in which there is a difference equal to an error that occurs during the process despite the same design.

In an embodiment, a length d1 of the first bridge patterns CP1-1*a* and CP1-1*b* may be substantially the same as a length d2 of the third bridge pattern CP1-3, and the length d1 of the first bridge patterns CP1-1*a* and CP1-1*b* may be substantially the same as a length d3 of the dummy patterns DMP1 and DMP2. In addition, the first bridge patterns CP1-1*a* and CP1-1*b*, the third bridge pattern CP1-3, and the dummy pattern DMP may be each arranged with other adjacent patterns at the constant interval in each of the first direction DR1 and the second direction DR2. In an embodiment, the first bridge patterns CP1-1*a* and CP1-1*b*, the third bridge pattern CP1-3, and the dummy pattern DMP may be each arranged for a distance to the other adjacent patterns in each of the first direction DR1 and the second direction DR2 to have the constant interval.

Figure 10A:
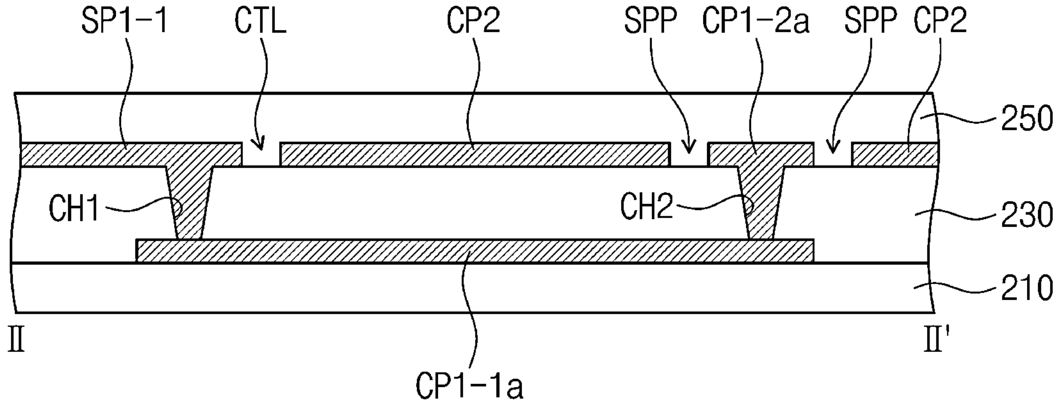
FIG. 10A is a cross-sectional view of a portion of an input sensor, according to an embodiment.
Figure 10B:
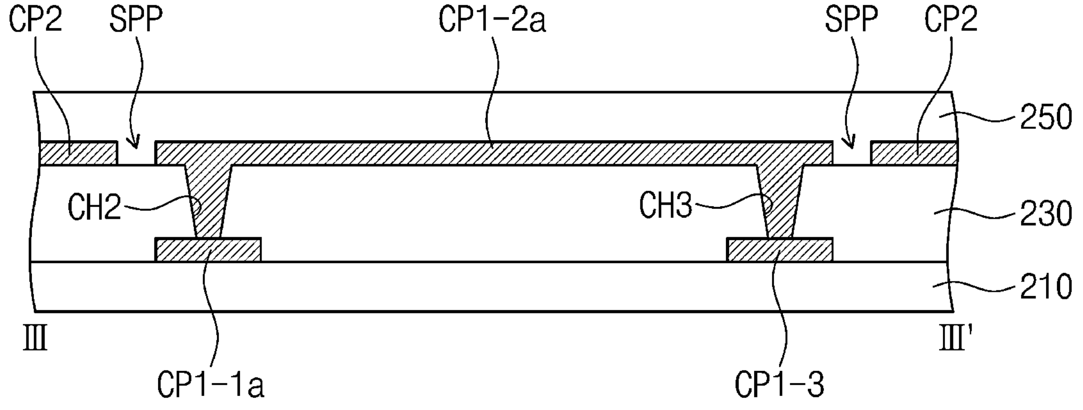
FIG. 10B is a cross-sectional view of a portion of an input sensor, according to an embodiment.
Figure 10C:
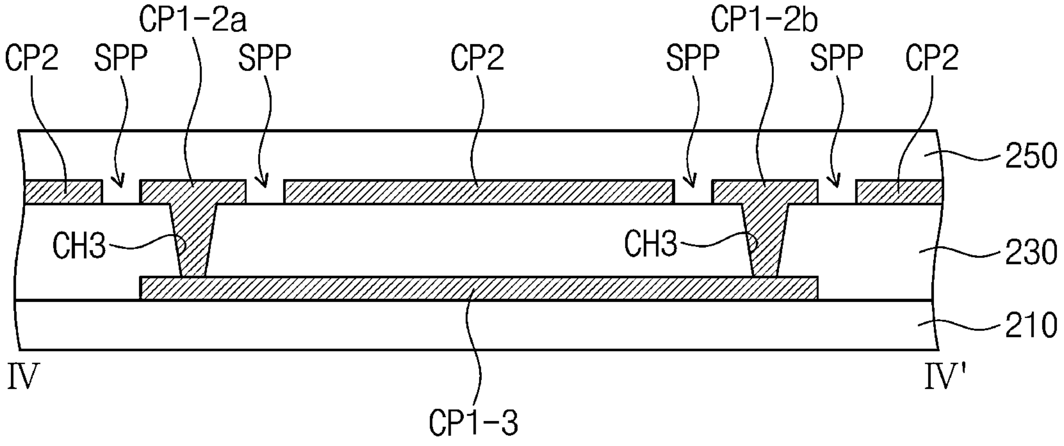
FIG. 10C is a cross-sectional view of a portion of an input sensor, according to an embodiment.

FIGS. 10A to 10C are cross-sectional views of a portion of an input sensor, according to an embodiment. FIG. 10A illustrates a cross-section corresponding to line II-II' illustrated in FIG. 8. FIG. 10B illustrates a cross-section corresponding to line III-III' illustrated in FIG. 8. FIG. 10C illustrates a cross-section corresponding to line IV-IV' illustrated in FIG. 8.

In an embodiment and referring to FIGS. 8 to 10C, the first bridge patterns CP1-1*a* and CP1-1*b* and the third bridge pattern CP1-3 may be disposed on a first layer, and the second bridge patterns CP1-2*a* and CP1-2*b*, the first sensing pattern SP1, and the connection pattern CP2 may be disposed on a second layer different from the first layer. The first bridge patterns CP1-1*a* and CP1-1*b* and the third bridge pattern CP1-3 may be included in the first conductive layer 220 described in FIG. 5 and disposed on the first insulating layer 210, and the second bridge patterns CP1-2*a* and CP1-2*b*, the first sensing pattern SP1, and the connection pattern CP2 may be included in the second conductive layer 240 and disposed on the second insulating layer 230. FIGS. 10A to 10C each exemplarily illustrate a disposition relationship on a cross-section of the (1-1)-th sensing pattern SP1-1 of the first sensing patterns SP1, the (1-1)-th bridge pattern CP1-1*a* of the first bridge patterns CP1-1*a* and CP1-1*b*, the (2-1)-th bridge pattern CP1-2*a* of the second bridge patterns CP1-2*a* and CP1-2*b*, the third bridge pattern CP1-3, and the (2-2)-th bridge pattern CP1-2*b* of the second bridge patterns CP1-2*a* and CP1-2*b*, but similar description may be applied to the (1-2)-th sensing pattern SP1-2 of the first sensing patterns SP1, and the (1-2)-th bridge pattern CP1-1*b* of the first bridge patterns CP1-1*a* and CP1-1*b* not illustrated in FIGS. 10A to 10C.

In an embodiment, although not shown, the first conductive layer 220 and the second conductive layer 240 may each have a three-layered conductive material structure. The first conductive layer 220 and the second conductive layer 240 may each have a thick metal layer having a low resistance, and a transparent conductive oxide layer disposed on and under the metal layer. The transparent conductive oxide layer may have a lower reflectance, a lower conductance, and a smaller thickness than the metal layer. The metal layer having a low resistance may substantially correspond to a signal moving path, and the transparent conductive oxide layer having a lower reflectance may cover the metal layer to lower external light reflectance. In the input sensor 200, according to an embodiment, a plurality of conductive patterns may be disposed in a small area on a plane by increasing a thickness through the three-layered structure.

In an embodiment and referring to FIGS. 8 and 10A, the (1-1)-th sensing pattern SP1-1 included in the first sensing electrode SE1 may be electrically connected to the (1-1)-th bridge pattern CP1-1*a* through the first contact hole CH1. The first contact hole CH1 may penetrate the second insulating layer 230. The (1-1)-th sensing pattern SP1-1 disposed on the second insulating layer 230 may be electrically connected to the (1-1)-th bridge pattern CP1-1*a* through the first contact hole CH1.

In an embodiment, the (1-1)-th bridge pattern CP1-1*a* may be electrically connected to the (2-1)-th bridge pattern CP1-2*a* through the second contact hole CH2. The second contact hole CH2 may penetrate the second insulating layer 230. The (2-1)-th bridge pattern CP1-2*a* disposed on the second insulating layer 230 may be electrically connected to the (1-1)-th bridge pattern CP1-1*a* through the second contact hole CH2.

In an embodiment, the (1-1)-th sensing pattern SP1-1, the connection pattern CP2, and the (2-1)-th bridge pattern CP1-2*a* disposed on the same layer may be spaced apart to be insulated from each other. The boundary portion CTL may be defined between the (1-1)-th sensing pattern SP1-1 and the connection pattern CP2, and the cutting portion SPP may be defined between the connection pattern CP2 and the (2-1)-th bridge pattern CP1-2*a*. The (1-1)-th sensing pattern SP1-1 and the connection pattern CP2 may be insulated from each other by the boundary portion CTL, and the connection pattern CP2 and the (2-1)-th bridge pattern CP1-2*a* may be insulated from each other by the cutting portion SPP.

In an embodiment and referring to FIGS. 8 and 10B, the (1-1)-th bridge pattern CP1-1*a* may be electrically connected to the (2-1)-th bridge pattern CP1-2*a* through the second contact hole CH2. The second contact hole CH2 may penetrate the second insulating layer 230. The (2-1)-th bridge pattern CP1-2*a* disposed on the second insulating layer 230 may be electrically connected to the (1-1)-th bridge pattern CP1-1*a* through the second contact hole CH2.

In an embodiment, the (2-1)-th bridge pattern CP1-2*a* may be electrically connected to the third bridge pattern CP1-3 through the third contact hole CH3. The third contact hole CH3 may penetrate the second insulating layer 230. The (2-1)-th bridge pattern CP1-2*a* disposed on the second insulating layer 230 may be electrically connected to the third bridge pattern CP1-3 through the third contact hole CH3.

In an embodiment, the connection pattern CP2 and the (2-1)-th bridge pattern CP1-2*a* disposed on the same layer may be spaced apart to be insulated from each other. The cutting portion SPP may be defined between the connection pattern CP2 and the (2-1)-th bridge pattern CP1-2*a*. The connection pattern CP2 and the (2-1)-th bridge pattern CP1-2*a* may be insulated from each other by the cutting portion SPP.

In an embodiment and referring to FIGS. 8 and 10C, the (2-1)-th bridge pattern CP1-2*a* may be electrically connected to the third bridge pattern CP1-3 through the third contact hole CH3. The third contact hole CH3 may penetrate the second insulating layer 230. The (2-1)-th bridge pattern CP1-2*a* disposed on the second insulating layer 230 may be electrically connected to the third bridge pattern CP1-3 through the third contact hole CH3.

In an embodiment, the (2-2)-th bridge pattern CP1-2*b* may be electrically connected to the third bridge pattern CP1-3 through the third contact hole CH3. The third contact hole CH3 may penetrate the second insulating layer 230. The (2-2)-th bridge pattern CP1-2*b* disposed on the second insulating layer 230 may be electrically connected to the third bridge pattern CP1-3 through the third contact hole CH3.

In an embodiment, the connection pattern CP2, the (2-1)-th bridge pattern CP1-2*a*, and the (2-2)-th bridge pattern CP1-2*b* disposed on the same layer may be spaced apart to be insulated from each other. The cutting portion SPP may be defined between the connection pattern CP2 and the (2-1)-th bridge pattern CP1-2*a*, and between the connection pattern CP2 and the (2-2)-th bridge pattern CP1-2*b*. The connection pattern CP2 and the (2-1)-th bridge pattern CP1-2*a* may be insulated from each other by the cutting portion SPP, and the connection pattern CP2 and the (2-2)-th bridge pattern CP1-2*b* may be insulated from each other by the cutting portion SPP.

In an input sensor, according to an embodiment, a bridge pattern connecting first sensing patterns includes a first bridge pattern connected to the first sensing pattern through a first contact hole, and a second bridge pattern connected to the first bridge pattern through a second contact hole. In the input sensor, according to an embodiment, the bridge pattern may have a structure including the first bridge pattern and the second bridge pattern disposed on different layers, thereby preventing a failure that the bridge pattern is viewed from the outside.

Unlike the input sensor, according to an embodiment, in case that the bridge pattern connecting the first sensing patterns does not include the first bridge pattern and the second bridge pattern, and the first sensing patterns are connected by only the first bridge pattern disposed on a layer different therefrom, the first bridge pattern may be formed long, thereby having a shape different from a plurality of dummy patterns included in the input sensor. In addition, since the bridge pattern has a shape different from the dummy patterns, it may be difficult to arrange the bridge pattern and the dummy patterns at the same interval. In this case, a limitation that the first bridge pattern extending long is viewed from the outside may occur.

In the input sensor, according to an embodiment, since the bridge pattern connecting the first sensing patterns has a shape including the first bridge pattern directly connected to the first sensing pattern, and the second bridge pattern disposed on a layer different from the first bridge pattern, the first bridge pattern may have the same shape as the dummy patterns, and the first bridge pattern, the third bridge pattern, and the dummy patterns may be arranged at a constant interval. Accordingly, a conductive pattern having three layers composed of a portion in which the first bridge pattern and the sensing patterns overlap each other, a portion in which the dummy pattern and the sensing electrodes overlap each other, and a portion in which the third bridge pattern and the sensing electrodes overlap each other may be provided at a constant shape and interval, thereby preventing a failure that only a portion of the input sensor is brightly viewed from the outside. In addition, viewability and reliability of a display device including the input sensor may be improved.

Figure 11:
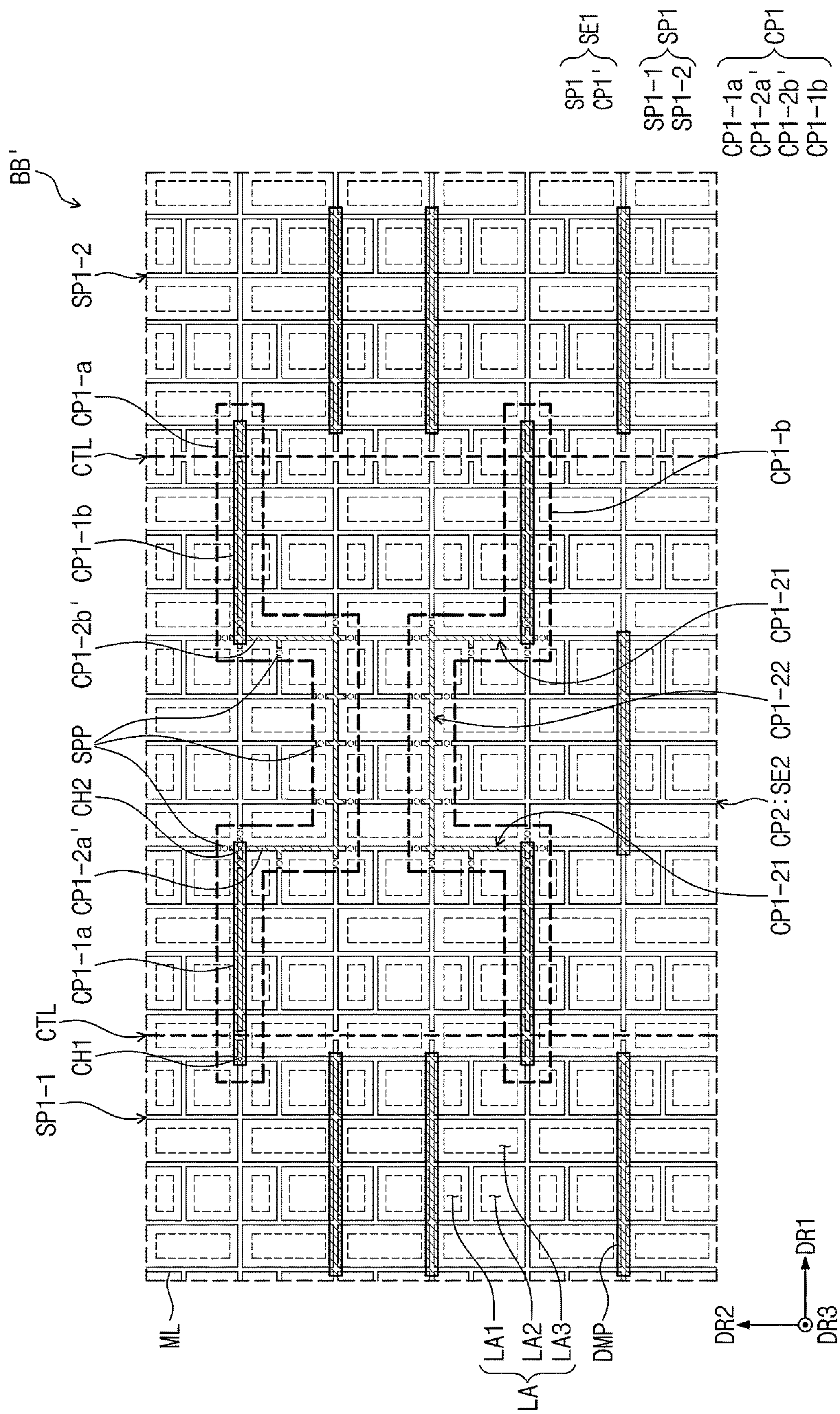
FIG. 11 is an enlarged plan view of a portion of an input sensor, according to an embodiment.

FIG. 11 is an enlarged plan view of a portion of an input sensor, according to an embodiment. A portion corresponding to region BB' illustrated in FIG. 6A is shown as an enlarged view in FIG. 11. FIG. 11 illustrates an input sensor, according to another embodiment, different from the input sensor according to an embodiment illustrated in FIG. 8, and hereinafter, wherein the difference between the input sensor illustrated in FIG. 11 and the input sensor illustrated in FIG. 8 will be described.

In an embodiment and referring to FIG. 11, in the input sensor, a bridge pattern CP1' electrically connects two adjacent first sensing patterns SP1. The bridge pattern CP1' overlaps a first contact hole CH1 on a plane, and electrically connects the two adjacent first sensing patterns SP1 through the first contact hole CH1.

In an embodiment, the bridge pattern CP1' includes first bridge patterns CP1-1*a* and CP1-1*b* overlapping the first contact hole CH1, second bridge patterns CP1-2*a* and CP1-2*b* overlapping the second contact hole CH2. The first bridge patterns CP1-1*a* and CP1-1*b* overlap the first contact hole CH1 and the second contact hole CH2. Meanwhile, unlike the bridge pattern CP1 illustrated in FIG. 8, in another embodiment, the bridge pattern CP1' may not include the third bridge pattern CP1-3.

In an embodiment, the first bridge patterns CP1-1*a* and CP1-1*b* overlap the first contact hole CH1, and is connected to any one corresponding to the first sensing patterns SP1 by the first contact hole CH1. The first bridge patterns CP1-1*a* and CP1-1*b* partially overlap the first sensing patterns SP1. The first bridge patterns CP1-1*a* and CP1-1*b* partially overlap a boundary portion CTL defined between the first sensing electrode SE1 and the second sensing electrode SE2. The first bridge patterns CP1-1*a* and CP1-1*b* may have rod shapes extending along the first direction DR1.

In an embodiment, the first bridge patterns CP1-1*a* and CP1-1*b* may include a (1-1)-th bridge pattern CP1-1*a* and a (1-2)-th bridge pattern CP1-1*b*. The (1-1)-th bridge pattern CP1-1*a* may be connected to a (1-1)-th sensing patterns SP1-1 by the first contact hole CH1, and the (1-2)-th bridge pattern CP1-1*b* may be connected to a (1-2)-th sensing patterns SP1-2 by the first contact hole CH1. The (1-1)-th bridge pattern CP1-1*a* and the (1-2)-th bridge pattern CP1-1*b* may be spaced apart from each other on a plane. The (1-1)-th bridge pattern CP1-1*a* and the (1-2)-th bridge pattern CP1-1*b* may be spaced apart from each other on a plane, but may be electrically connected to each other through second bridge patterns CP1-2*a*' and CP1-2*b*' to be described later.

In an embodiment, the second bridge patterns CP1-2*a*' and CP1-2*b*' overlap the second contact hole CH2, and are connected to the first bridge patterns CP1-1*a* and CP1-1*b* by the second contact hole CH2. The second bridge patterns CP1-2*a*' and CP1-2*b*' may include a (2-1)-th bridge pattern CP1-2*a*' and a (2-2)-th bridge pattern CP1-2*b*'. The (2-1)-th bridge pattern CP1-2*a*' may be connected to the (1-1)-th bridge pattern CP1-1*a* by the second contact hole CH2, and the (2-2)-th bridge pattern CP1-2*b*' may be connected to the (1-2)-th bridge pattern CP1-1*b* by the second contact hole CH2.

In an embodiment, the second bridge patterns CP1-2*a*' and CP1-2*b*' may extend along the second direction DR2. The second bridge patterns CP1-2*a* and CP1-2*b*' may have a mesh line structure including a main portion extending along the second direction DR2, and a protrusion portion protruding from the main portion along the first direction DR1.

In an embodiment, the second bridge patterns CP1-2*a*' and CP1-2*b*' may include a mesh line ML together with the connection pattern CP2, and a cutting portion SPP may be defined between the second bridge patterns CP1-2*a*' and CP1-2*b*' and the connection pattern CP2. The second bridge patterns CP1-2*a*' and CP1-2*b*' and the connection pattern CP2 may be spaced apart from each other with the cutting portion SPP disposed therebetween. Meanwhile, after being formed in a form of a single layer having an integrated shape on the same layer, the second bridge patterns CP1-2*a*' and CP1-2*b*' and the connection pattern CP2 may be patterned to be spaced apart from each other with the cutting portion SPP disposed therebetween in an operation of forming the mesh line ML through a patterning process. The cutting portion SPP may be a portion in which the mesh lines ML are at least partially removed. The cutting portion SPP may be provided to each other to insulate the second bridge patterns CP1-2*a* and CP1-2*b*' and the connection pattern CP2.

In an embodiment, the (2-1)-th bridge pattern CP1-2*a*' and the (2-2)-th bridge pattern CP1-2*b*' may be connected to each other to have an integrated shape. In FIG. 11, for convenience of description, the (2-1)-th bridge pattern CP1-2*a*' and the (2-2)-th bridge pattern CP1-2*b*' are separately described, but the (2-1)-th bridge pattern CP1-2*a*' and the (2-2)-th bridge pattern CP1-2*b*' may be connected to each other to have the integrated shape. That is, the (2-1)-th bridge pattern CP1-2*a*' and the (2-2)-th bridge pattern CP1-2*b*' may be formed together by patterning the cutting portion SPP for being insulated with the connection pattern CP2 on an integrated conductive layer.

In an embodiment, the (2-1)-th bridge pattern CP1-2*a*' and the (2-2)-th bridge pattern CP1-2*b*' may respectively include a first extension CP1-21 extending along the second direction DR2, and a second extension CP1-22 extending along the first direction DR1. In an embodiment, the first extension CP1-21 and the second extension CP1-22 may be spaced apart from each other on a plane, and may have an integrated shape when connected to each other.

According to an embodiment, a failure that conductive patterns of an input sensor included in a display device is unusually partially viewed from the outside may be prevented, thereby improving viewability of the input sensor including the conductive patterns, and the display device including the input sensor, In the above, description has been made with reference to preferred embodiments of the invention, but those with ordinary skill in the art will understand that various modifications and changes may be made to the invention without departing from the spirit and the scope of the invention. Therefore, the scope of the invention is not limited to the contents described in the detailed description of the specification. Moreover, the embodiments or parts of the embodiments may be combined in whole or in part without departing from the scope of the invention.

What is claimed is:

1. A display device comprising:

a display panel including a plurality of light-emitting regions; and an input sensor disposed on the display panel, and including a plurality of conductive patterns, wherein the plurality of conductive patterns includes a first sensing electrode including a plurality of first sensing patterns provided along a first direction, and a plurality of bridge patterns connecting two adjacent first sensing patterns of the plurality of first sensing patterns, a second sensing electrode spaced apart from the first sensing electrode, and including a plurality of second sensing patterns provided along a second direction crossing the first direction, and a plurality of dummy patterns overlapping at least one of the first sensing electrode or the second sensing electrode on a plane, where each of the plurality of first sensing patterns and the plurality of second sensing patterns includes a plurality of mesh lines in which a plurality of openings overlapping the plurality of light-emitting regions are defined, and where each of the plurality of bridge patterns includes a first bridge pattern connected to a corresponding first sensing pattern of the plurality of first sensing patterns through a first contact hole, and a second bridge pattern disposed on a layer different from the first bridge pattern, and connected to the first bridge pattern through a second contact hole, wherein each of the plurality of dummy patterns and the first bridge pattern has a rod shape, and each of the plurality of dummy patterns has substantially the same shape and length in the first direction as the first bridge pattern, and each of the plurality of the dummy patterns and the first bridge patterns are spaced apart from each other on a plane, and the dummy patterns and the first bridge patterns are arranged at a constant interval in the first direction.

2. The display device of claim 1, wherein the plurality of first sensing patterns comprise a (1-1)-th sensing pattern, and a (1-2)-th sensing pattern disposed adjacent to the (1-1)-th sensing pattern along the first direction, the first bridge pattern comprises a (1-1)-th bridge pattern connected to the (1-1)-th sensing pattern, and a (1-2)-th bridge pattern connected to the (1-2)-th sensing pattern, and the (1-1)-th bridge pattern and the (1-2)-th bridge pattern are spaced apart from each other.

3. The display device of claim 2, wherein the second bridge pattern comprises a (2-1)-th bridge pattern connected to the (1-1)-th bridge pattern, and a (2-2)-th bridge pattern connected to the (1-2)-th bridge pattern.

4. The display device of claim 3, wherein the (2-1)-th bridge pattern and the (2-2)-th bridge pattern are connected to each other to form an integrated shape.

5. The display device of claim 3, wherein each of the plurality of bridge patterns further comprises a third bridge pattern disposed on a layer different from the second bridge pattern, and connected to at least one of the (2-1)-th bridge pattern and the (2-2)-th bridge pattern.

6. The display device of claim 5, wherein the third bridge pattern partially overlaps the second sensing electrode on a plane.

7. The display device of claim 5, wherein the third bridge pattern is connected to each of the (2-1)-th bridge pattern and the (2-2)-th bridge pattern.

8. The display device of claim 5, wherein the third bridge pattern is disposed on the same layer as the first bridge pattern.

9. The display device of claim 5, wherein a length of the first bridge pattern in the first direction is substantially the same as a length of the third bridge pattern in the first direction.

10. The display device of claim 1, wherein the second bridge pattern is disposed on the same layer as the first sensing patterns and the second sensing patterns.

11. The display device of claim 10, wherein the second sensing electrode further comprises a connection pattern disposed between two adjacent second sensing patterns of the plurality of second sensing patterns, and having an integrated shape with the plurality of second sensing patterns, the second bridge pattern is disposed adjacent to the connection pattern, and a cutting portion is defined between the second bridge pattern and the connection pattern.

12. The display device of claim 1, wherein the input sensor further comprises an insulating sensing layer disposed between the first bridge pattern and the plurality of first sensing patterns, and wherein the first contact hole and the second contact hole are defined in the insulating sensing layer.

13. The display device of claim 1, wherein a boundary portion is defined between the first sensing pattern and the second sensing electrode, and wherein the first bridge pattern partially overlaps the boundary portion.

14. The display device of claim 1, wherein each of the plurality of bridge patterns comprises:

a first bridge pattern disposed on a first layer and connected to a corresponding first sensing pattern through a first contact hole;

a second bridge pattern disposed on a second layer different from the first layer and connected to the first bridge pattern through a second contact hole, wherein the second bridge pattern comprises a (2-1)-th bridge pattern and a (2-2)-th bridge pattern that are spaced apart from each other in the second direction; and a third bridge pattern disposed on the same layer as the first bridge pattern and connected to at least one of the (2-1)-th bridge pattern and the (2-2)-th bridge pattern through a third contact hole.

15. The display device of claim 1, wherein the first bridge pattern extends in the first direction, and the second bridge pattern extends in the second direction.

16. The display device of claim 1, wherein the plurality of first sensing patterns comprise a (1-1)-th sensing pattern, and a (1-2)-th sensing pattern disposed adjacent to the (1-1)-th sensing pattern extending along the first direction, and the plurality of bridge patterns comprise:
a first sub-bridge pattern connecting the (1-1)-th sensing pattern and the (1-2)-th sensing pattern; and
a second sub-bridge pattern connecting the (1-1)-th sensing pattern and the (1-2)-th sensing pattern.

17. The display device of claim 1, wherein the plurality of light-emitting regions comprise:
a first light-emitting region configured to emit a first color light;
a second light-emitting region configured to emit a second color light different from the first color light; and
a third light-emitting region configured to emit a third color light different from the first color light and the second color light,
wherein the first light-emitting region and the second light-emitting region are alternately arranged along the second direction, and
the third light-emitting region is arranged to be spaced apart from the first light-emitting region and the second light-emitting region along the first direction.

18. A display device comprising:
a display panel including a plurality of light-emitting regions; and
an input sensor disposed on the display panel, and including a plurality of conductive patterns,
wherein the plurality of conductive patterns include
a first sensing electrode including a plurality of first sensing patterns provided along a first direction, and a plurality of bridge patterns connecting two adjacent first sensing patterns of the plurality of first sensing patterns, and
a second sensing electrode spaced apart from the first sensing electrode, and including a plurality of second sensing patterns extending along a second direction crossing the first direction, and
a plurality of dummy patterns overlapping at least one of the plurality of first sensing patterns or the plurality of second sensing patterns on a plane,
where each of the plurality of first sensing patterns and the plurality of second sensing patterns includes a plurality of mesh lines in which a plurality of openings overlapping the plurality of light-emitting regions are defined,
where each of the plurality of bridge patterns includes
a first bridge pattern connected to a corresponding first sensing pattern of the plurality of first sensing patterns through a first contact hole, and extending along the first direction, and
a second bridge pattern connected to the first bridge pattern through a second contact hole, and extending along the second direction,
wherein each of the plurality of dummy patterns and the first bridge pattern has a rod shape, and each of the plurality of dummy patterns has substantially the same shape and length in the first direction as the first bridge pattern, and
each of the plurality of the dummy patterns and the first bridge patterns are spaced apart from each other on a plane, and the dummy patterns and the first bridge patterns are arranged at a constant interval in the first direction.

19. The display device of claim 18, wherein the second bridge pattern is disposed on the same layer as the first sensing patterns and the second sensing patterns, and
the first bridge pattern is disposed on a layer different from the second bridge pattern.

20. A display device comprising:
a display panel including a plurality of light-emitting regions; and
an input sensor disposed on the display panel, and including a plurality of conductive patterns,
wherein the plurality of conductive patterns include
a first sensing electrode including a plurality of first sensing patterns extending along a first direction, and a plurality of bridge patterns connecting two adjacent first sensing patterns of the plurality of first sensing patterns,
a second sensing electrode spaced apart from the first sensing electrode, and including a plurality of second sensing patterns extending along a second direction crossing the first direction, and
a plurality of dummy patterns overlapping at least one of the plurality of first sensing patterns or the plurality of second sensing patterns on a plane,
where each of the plurality of first sensing patterns and the plurality of second sensing patterns includes a plurality of mesh lines in which a plurality of openings overlapping the plurality of light-emitting regions are defined,
where each of the plurality of bridge patterns includes
a first bridge pattern connected to one corresponding first sensing pattern of the plurality of first sensing patterns through a first contact hole, and
a second bridge pattern at least partially disposed on the same layer as the second sensing electrode, and connected to the first bridge pattern through a second contact hole, and
a cutting portion is defined between the second bridge pattern and the second sensing electrode,
wherein each of the plurality of dummy patterns and the first bridge pattern has a rod shape, and each of the plurality of dummy patterns has substantially the same shape and length in the first direction as the first bridge pattern, and
each of the plurality of the dummy patterns and the first bridge patterns are spaced apart from each other on a plane, and the dummy patterns and the first bridge patterns are arranged at a constant interval in the first direction.

* * * * *